(12) United States Patent
Lauritzen et al.

(10) Patent No.: US 9,715,837 B2
(45) Date of Patent: Jul. 25, 2017

(54) TEXT READING AND TRANSLATION IN A VISUAL PROSTHESIS

(71) Applicant: Second Sight Medical Products, Inc., San Fernando, CA (US)

(72) Inventors: Thomas Lauritzen, West Hollywood, CA (US); Jessy D Dorn, Los Angeles, CA (US); Robert J Greenberg, Los Angeles, CA (US); Jordan Harris, Vancouver (CA); Jose Alain Sahel, Paris (FR)

(73) Assignee: Second Sight Medical Products, Inc., Sylmar, CA (US)

( * ) Notice: Subject to any disclaimer, the term of this patent is extended or adjusted under 35 U.S.C. 154(b) by 127 days.

(21) Appl. No.: 13/721,685

(22) Filed: Dec. 20, 2012

(65) Prior Publication Data

US 2013/0157229 A1 Jun. 20, 2013

Related U.S. Application Data

(60) Provisional application No. 61/578,118, filed on Dec. 20, 2011, provisional application No. 61/663,781, filed on Jun. 25, 2012.

(51) Int. Cl.
G09B 21/00 (2006.01)
(52) U.S. Cl.
CPC ......... *G09B 21/001* (2013.01); *G09B 21/003* (2013.01)
(58) Field of Classification Search
CPC .... G09B 21/00; G09B 21/001; G09B 21/003; G09B 21/004; G09B 21/007; Y10S 623/905; Y10S 623/906; Y10S 623/907; A61H 3/061; A61F 9/08; G06K 9/6821

USPC .................................................. 434/112–117
See application file for complete search history.

(56) References Cited

U.S. PATENT DOCUMENTS

| | | | |
|---|---|---|---|
| 4,573,481 A | | 3/1986 | Bullara |
| 4,628,933 A | | 12/1986 | Michelson |
| 4,837,049 A | | 6/1989 | Byers et al. |
| 5,109,844 A | | 5/1992 | de Juan, Jr. et al. |
| 5,215,088 A | | 6/1993 | Normann et al. |
| 5,653,751 A | * | 8/1997 | Samiy et al. ............ 623/6.63 |
| 5,935,155 A | | 8/1999 | Humayun et al. |
| 6,159,013 A | * | 12/2000 | Parienti .................... 434/114 |

(Continued)

OTHER PUBLICATIONS

Dobelle, WH "Braille Reading by a Blind Volunteer by Visual Cortex Stimulation", Nature, vol. 259, Jan. 15, 1976, pp. 111-112.*

*Primary Examiner* — Sam Yao
*Assistant Examiner* — Michael Humphrey
(74) *Attorney, Agent, or Firm* — Scott Dunbar

(57) ABSTRACT

The present invention is a visual prosthesis which restores partial vision to patients blinded by outer retinal degeneration. While visual prosthesis users have achieved remarkable visual improvement to the point of reading letters and short sentences, the reading process is still fairly cumbersome. In the present invention the visual prosthesis is adapted to stimulate visual braille as a sensory substitution for reading written letters and words. The visual prosthesis system, used in the present invention, includes a 10×6 electrode array implanted epiretinally, a tiny video camera mounted on a pair of glasses, and a wearable computer that processes the video and determines the stimulation current of each electrode in real time.

9 Claims, 24 Drawing Sheets

(56) References Cited

U.S. PATENT DOCUMENTS

| | | | |
|---|---|---|---|
| 6,326,901 B1* | 12/2001 | Gonzales | 340/7.2 |
| 6,400,989 B1 | 6/2002 | Eckmiller | |
| 6,458,157 B1 | 10/2002 | Suaning | |
| 6,930,590 B2* | 8/2005 | Ling et al. | 340/407.1 |
| 6,948,937 B2* | 9/2005 | Tretiakoff et al. | 434/112 |
| 7,903,878 B2* | 3/2011 | Foss | 382/182 |
| 8,239,032 B2* | 8/2012 | Dewhurst | 607/54 |
| 8,594,387 B2* | 11/2013 | Kobeli et al. | 382/114 |
| 2005/0106536 A1* | 5/2005 | Liebermann | 434/112 |
| 2008/0097547 A1* | 4/2008 | Vyas et al. | 607/54 |
| 2010/0036457 A1* | 2/2010 | Sarpeshkar et al. | G09B 21/008 607/53 |
| 2011/0181444 A1* | 7/2011 | Mauduit et al. | 341/21 |

\* cited by examiner

| | | | | | |
|---|---|---|---|---|---|
| A | • | J | •.<br>.• | S | .•<br>•. |
| B | •<br>• | K | •<br>•<br> • | T | .•<br>•• |
| C | •• | L | •<br>•<br>• | U | •<br> •• |
| D | ••<br> • | M | ••<br> •<br> • | V | •<br>•<br>•• |
| E | •<br> • | N | ••<br> •<br> • | W | .•<br>••<br>.• |
| F | ••<br>• | O | •<br> •<br> • | X | ••<br> ••<br> • |
| G | ••<br>•• | P | ••<br>•<br>• | Y | ••<br> ••<br> •• |
| H | •<br>•• | Q | ••<br>••<br>• | Z | •<br> ••<br> •• |
| I | .•<br>• | R | •<br>••<br>• | | |

TEXT READING AND TRANSLATION IN A VISUAL PROSTHESIS

FIELD

The present disclosure relates to visual prostheses configured to provide neural stimulation for the creation of artificial vision, and more specifically, an improved method of presenting written characters by converting written characters to braille characters and presenting the braille characters visually.

BACKGROUND

Ever since 1755 when LeRoy passed the discharge of a Leyden through the orbit of man and caused a visual percept, there has been a fascination with electrically elicited visual perception. The general concept of electrical stimulation of retinal cells to produce these flashes of light or phosphenes has been known for quite some time. Based on these general principles, some early attempts at devising a prosthesis for aiding the visually impaired have included attaching electrodes to the head or eyelids of patients. While some of these early attempts met with some limited success, these early prosthetic devices were large, bulky and could not produce adequate simulated vision to truly aid the visually impaired.

In the early 1930's, Foerster investigated the effect of electrically stimulating the exposed occipital pole of one cerebral hemisphere. He found that, when a point at the extreme occipital pole was stimulated, the patient perceived a small spot of light directly in front and motionless (a phosphene). Subsequently, Brindley and Lewin (1968) thoroughly studied electrical stimulation of the human occipital (visual) cortex. By varying the stimulation parameters, these investigators described in detail the location of the phosphenes produced relative to the specific region of the occipital cortex stimulated. These experiments demonstrated: (1) the consistent shape and position of phosphenes; (2) that increased stimulation pulse duration made phosphenes brighter; and (3) that there was no detectable interaction between neighboring electrodes which were as close as 2.4 mm apart.

As intraocular surgical techniques have advanced, it has become possible to apply stimulation on small groups and even on individual retinal cells to generate focused phosphenes through devices implanted within the eye itself. This has sparked renewed interest in developing methods and apparatuses to aid the visually impaired. Specifically, great effort has been expended in the area of intraocular visual prosthesis devices in an effort to restore vision in cases where blindness is caused by photoreceptor degenerative retinal diseases such as retinitis pigmentosa and age related macular degeneration, which affect millions of people worldwide.

Neural tissue can be artificially stimulated and activated by prosthetic devices that pass pulses of electrical current through electrodes on such a device. The passage of current causes changes in electrical potentials across visual neuronal membranes, which can initiate visual neuron action potentials, which are the means of information transfer in the nervous system.

Based on this mechanism, it is possible to input information into the nervous system by coding the information as a sequence of electrical pulses which are relayed to the nervous system via the prosthetic device. In this way, it is possible to provide artificial sensations including vision.

One typical application of neural tissue stimulation is in the rehabilitation of the blind. Some forms of blindness involve selective loss of the light sensitive transducers of the retina. Other retinal neurons remain viable, however, and may be activated in the manner described above by placement of a prosthetic electrode device on the inner (toward the vitreous) retinal surface (epiretial). This placement must be mechanically stable, minimize the distance between the device electrodes and the visual neurons, and avoid undue compression of the visual neurons.

In 1986, Bullara (U.S. Pat. No. 4,573,481) patented an electrode assembly for surgical implantation on a nerve. The matrix was silicone with embedded iridium electrodes. The assembly fit around a nerve to stimulate it.

Dawson and Radtke stimulated cat's retina by direct electrical stimulation of the retinal ganglion cell layer. These experimenters placed nine and then fourteen electrodes upon the inner retinal layer (i.e., primarily the ganglion cell layer) of two cats. Their experiments suggested that electrical stimulation of the retina with 30 to 100 uA current resulted in visual cortical responses. These experiments were carried out with needle-shaped electrodes that penetrated the surface of the retina (see also U.S. Pat. No. 4,628,933 to Michelson).

The Michelson '933 apparatus includes an array of photosensitive devices on its surface that are connected to a plurality of electrodes positioned on the opposite surface of the device to stimulate the retina. These electrodes are disposed to form an array similar to a "bed of nails" having conductors which impinge directly on the retina to stimulate the retinal cells. U.S. Pat. No. 4,837,049 to Byers describes spike electrodes for neural stimulation. Each spike electrode pierces neural tissue for better electrical contact. U.S. Pat. No. 5,215,088 to Norman describes an array of spike electrodes for cortical stimulation. Each spike pierces cortical tissue for better electrical contact.

The art of implanting an intraocular prosthetic device to electrically stimulate the retina was advanced with the introduction of retinal tacks in retinal surgery. De Juan, et al. at Duke University Eye Center inserted retinal tacks into retinas in an effort to reattach retinas that had detached from the underlying choroid, which is the source of blood supply for the outer retina and thus the photoreceptors. See, e.g., E. de Juan, et al., 99 Am. J. Ophthalmol. 272 (1985). These retinal tacks have proved to be biocompatible and remain embedded in the retina, and choroid/sclera, effectively pinning the retina against the choroid and the posterior aspects of the globe. Retinal tacks are one way to attach a retinal array to the retina. U.S. Pat. No. 5,109,844 to de Juan describes a flat electrode array placed against the retina for visual stimulation. U.S. Pat. No. 5,935,155 to Humayun describes a visual prosthesis for use with the flat retinal array described in de Juan.

SUMMARY

The present invention is a visual prosthesis which restores partial vision to patients blinded by outer retinal degeneration. While visual prosthesis users have achieved remarkable visual improvement to the point of reading letters and short sentences, the reading process is still fairly cumbersome. In the present invention the visual prosthesis is adapted to stimulate visual braille as a sensory substitution for reading written letters and words. The visual prosthesis system, used in the present invention, includes a 10×6 electrode array implanted epiretinally, a tiny video camera mounted on a pair of glasses, and a wearable computer that processes the video and determines the stimulation current of each electrode in real time. In the braille reading system, individual letters are formed from different patterns of dots spanned by a 3×2 grid of six dots. For visual braille, a grid of six electrodes is chosen out of a 10×6 array. Groups of these electrodes are then directly stimulated (bypassing the camera) to create visual percepts of individual braille letters. The present invention can be implemented in multiple ways depending of the skills of the user and the resolution of the electrode array. A user can simply press a button which shifts the visual prosthesis into braille reading mode, or the system can replace letters in a visual scene by overlaying braille characters.

BRIEF DESCRIPTION OF THE FIGURES

FIG. 2A is a table of the braille alphabet.

FIG. 2B shows one possible choice of six braille dots represented on an electrode array.

FIGS. 14-1, 14-2, 14-3 and 14-4 show an exemplary embodiment of a video processing unit. FIG. 14-1 should be viewed at the left of FIG. 14-2. FIG. 14-3 should be viewed at the left of FIG. 14-4. FIGS. 14-1 and 14-2 should be viewed on top of FIGS. 14-3 and 14-4.

DETAILED DESCRIPTION

Figure 1:
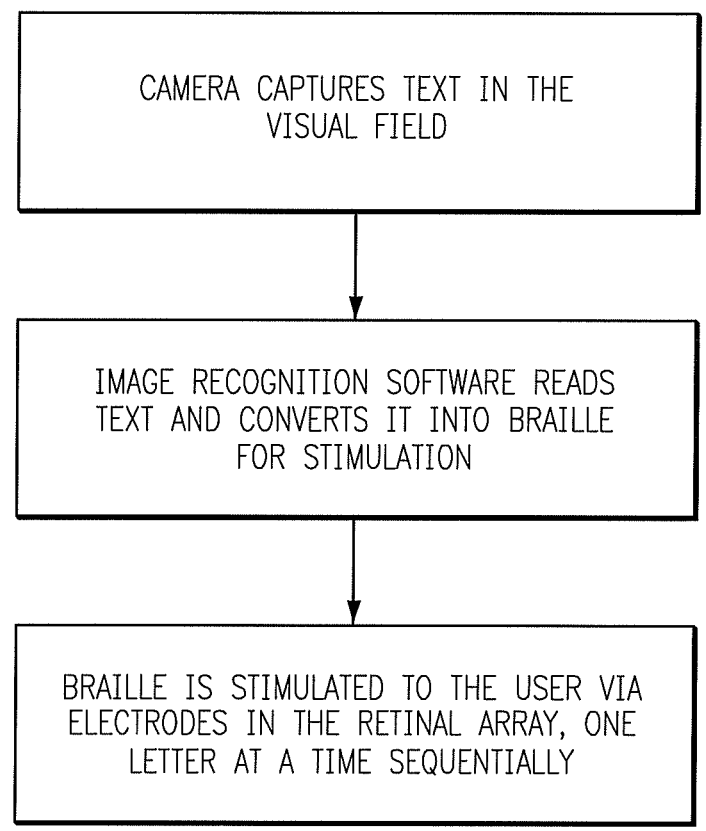
FIG. 1 is a flow chart outlining the process of the present invention.

Visual prostheses restore partial vision to people blinded by outer retinal degenerative diseases such as Retinitis Pigmentosa or Macular Degeneration. Recent results have demonstrated the ability of prosthesis users to read large letters and short words and sentences for some subjects. But with the current spatial resolution of prosthetic vision, reading takes 10s of seconds for single letters and minutes for short words, and requiring letters to be ~1-20 cm high at normal (approximately 30 cm) reading distance. While these results are in themselves are impressive, and the performance is expected to improve significantly with future prosthesis development, the practical application at current level is limited. For example, signs one might read while walking around have letters of a few centimeters in height, but are intended to be read from several meters distance, and it is not practical spending minutes to read each sign one might encounter. An alternative is to use the prosthesis to create percepts in the form of braille letters (to be read visually rather than tactually). For example, letter recognition software can identify text (e.g., from a sign), which can then be translated into braille and stimulated via the visual prosthesis. The present invention provides for reading visual braille with a visual prosthesis. FIG. 1, the process for the preferred embodiment proceeds as follow: a camera captures text in the visual field; image recognition software reads the text and converts the text into braille characters, and encodes those braille characters into stimulation patterns; and the braille characters.

Braille reading can be implemented in several ways. The system can prompt the user upon recognizing letters in a visual scene. The user can select a reading mode which presents just braille letters in sequence. The prosthesis can switch to reading mode upon recognizing letters in the visual scene and automatically present braille letters in sequence and switch back to normal mode. The system can, upon recognizing letters in a visual scene, superimpose braille letters over the written letters. The letters can be presented rapidly for example less than a second per letter, and preferably about a half a second per letter including breaks between letters. This allows the interruption of the user's view of the visual scene to be quite brief.

Here we present results showing that a visual prosthesis subject can read visually-stimulated braille. Performance is 89% correct for individual letters at 500 ms presentation, and 60-80% correct for short words, proving the feasibility of reading via visual braille.

Applicants have 30 subjects enrolled in a clinical study. The subjects are blinded by the degenerative retinal disease, Retinitis Pigmentosa (RP). RP causes the photoreceptor cells in the retina to die. Subjects are implanted with a visual prosthesis system which stimulates the surviving cells in the retina. Subjects have been implanted between 2.5 and 5.5 years. In addition to being implanted with a visual prosthesis, a subject must have the ability to read (tactile) braille and have spatial resolution high enough to isolate responses from 6 individual electrodes arranged in 3 by 2 pattern.

According to the present invention, the visual prosthesis is used in "direct stimulation mode", with camera bypassed and individual electrodes were stimulated, or a stimulation overlay replacing characters in a video image with braille characters, controlled by a computer.

Figures 1, 14:
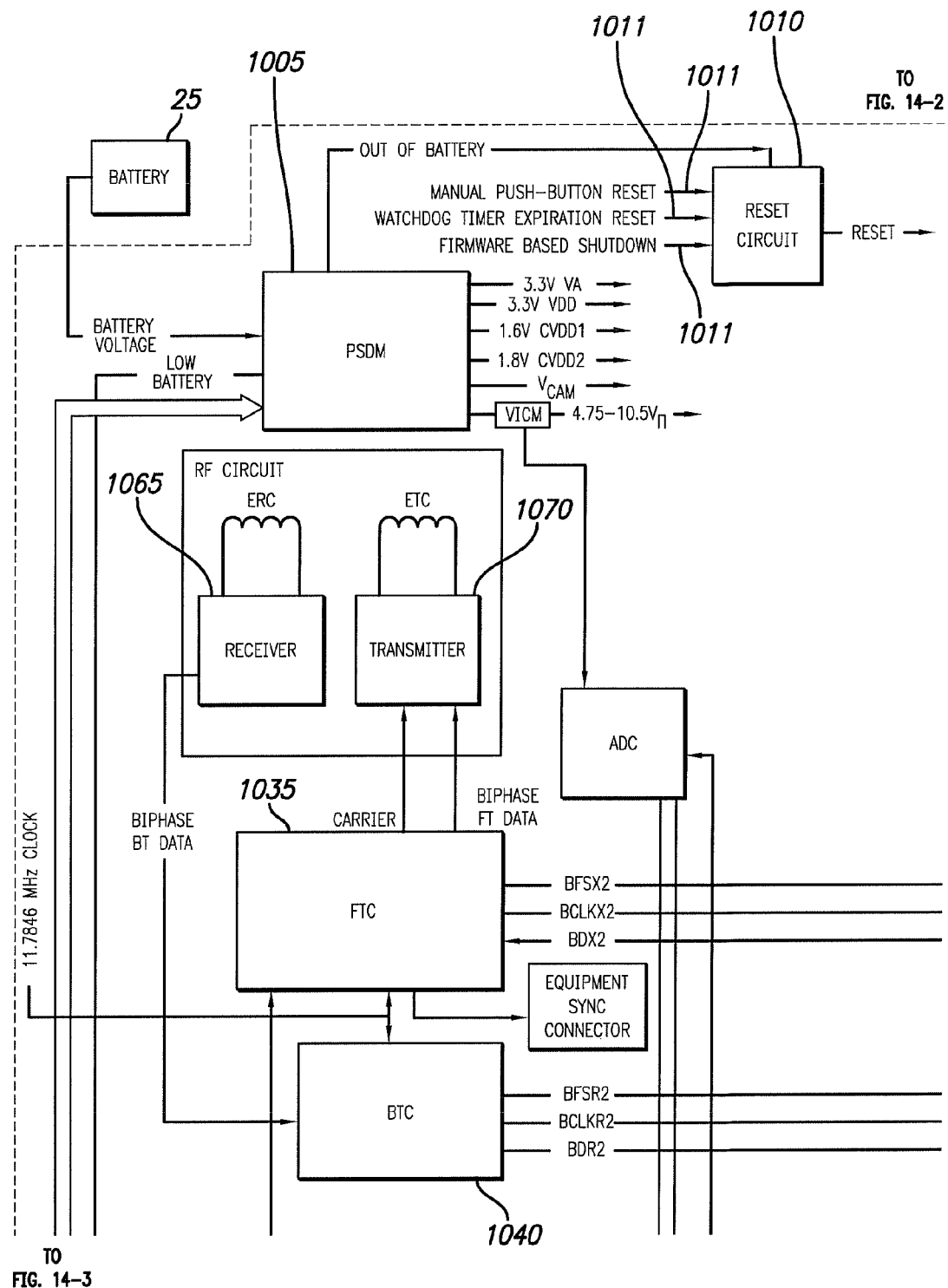
Figures 2, 14:
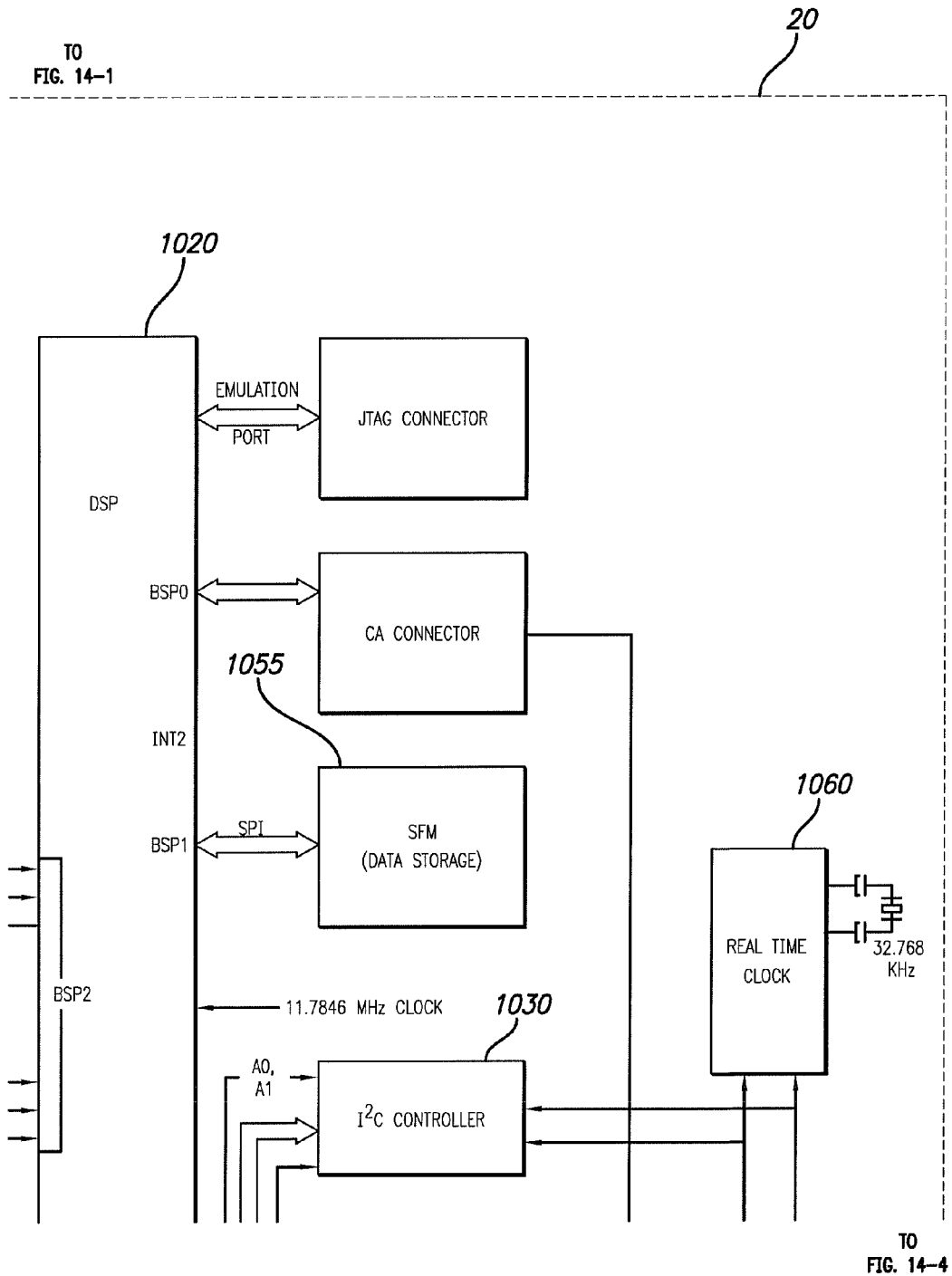

The basis for the braille alphabet is a 3 by 2 array of dots, and each letter has a specific configuration (FIG. 2A). For braille stimulation, sets of 6 electrodes are picked that spanned a 3 by 2 array. All 6 electrodes are stimulated at the same time with 20 Hz trains of 500 ms of 1 ms cathodic-anodic square pulses, i.e. 10 pulses. The current amplitude of pulses is set individually for each of the 6 electrodes to be 2.5-3 times the threshold for detection of a single electrode.

A set of 6 electrodes resulting in a perceived stimulus of 3 by 2 dots is selected based on feedback from the subject (FIG. 2B).

The following describes experiments to prove the effectiveness of the present invention. The experimental paradigm was inspired by the character recognition experiments of the Visual prosthesis subjects. For single letter recognition, the 26 letters of the alphabet were split into three sets of 8 or 9 letters: Set 1 (f, g, h, 1, o, p, r, v), set 2 (a, c, d, i, k, m, s, w, y) and set 3 (b, e, j, n, q, t, u, x, z). The subject was aware of which letters were contained in the current set. The letters were then stimulated in random order with 5 repeats of each letter in an 8- or 9-alternative forced-choice (AFC) paradigm. After each visual braille letter stimulation, the subject identified which letter was perceived, and the response was recorded by the experimenter. During the experiment, the subject could request that the letter set be repeated (i.e., he could be reminded of which letters were possible within the set). No other information was given to avoid biasing answers. A letter was presented as a 500 ms pulse train at 20 Hz with the subset of the 6 basis electrodes forming a given letter being active. To assure performance was not dependent on a narrow parameter range, the experiments were repeated with 40 and 60 Hz stimulation.

The subject was a native French speaker. To test the subject's ability to read words in visual braille, the 10 most common 2-, 3-, and 4-letter words in French were picked based on usage frequency. Each word was presented with 500 ms per letter and 1000 ms break between letters. Considerations on the timing between letters are discussed in below. The subject was informed that short words would be presented, but was not aware of which words were contained in the set. The order of the words was random and each word was stimulated once. The subject was allowed to request a single repetition of a word, but a guess would be considered a final answer. Responses were recorded by the experimenter.

TABLE 1

List of words (in French)

| 2-letter | 3-letter | 4-letter |
|---|---|---|
| de | les | dans |
| la | des | pour |
| et | que | elle |
| le | une | plus |
| il | est | mais |
| un | qui | nous |
| en | pas | avec |
| du | par | tout |
| je | sur | vous |
| ne | son | bien |

Answers were summed and significance of the proportion of correct answers was determined based on binomial distributions (correct/wrong) and chance levels, ⅛ or ⅑ depending on letter set.

Error analysis was performed by comparing the braille pattern of the letter guessed by the subject to the pattern of the correct letter. The degree of error was determined by assigning one point for: each dot that was not perceived, each missing dot that was perceived (false positive), or each dot that was perceived in a wrong place, then the points were summed. This resulted in zero degrees of error denoting a correct identification, and a maximum possible error of 6.

Single letters were stimulated in sets of 8 or 9 letters in an alternative forced choice (AFC) paradigm with five repetitions of each letter. Single letters were presented for 500 ms. Letter recognition was high for all presented letters. The detection rate at 20 Hz stimulation for the three letter sets ranged between 75-98% with a mean of 89% correct, and all were highly significantly above chance level ($p<0.001$) (FIG. 3A-3D). Stimulation at 40 Hz and 60 Hz yielded 85% and 77% mean correct, both significantly above chance recognition ($p<0.001$) and not significantly different from the recognition rate at 20 Hz stimuli (data not shown).

Figure 3A:
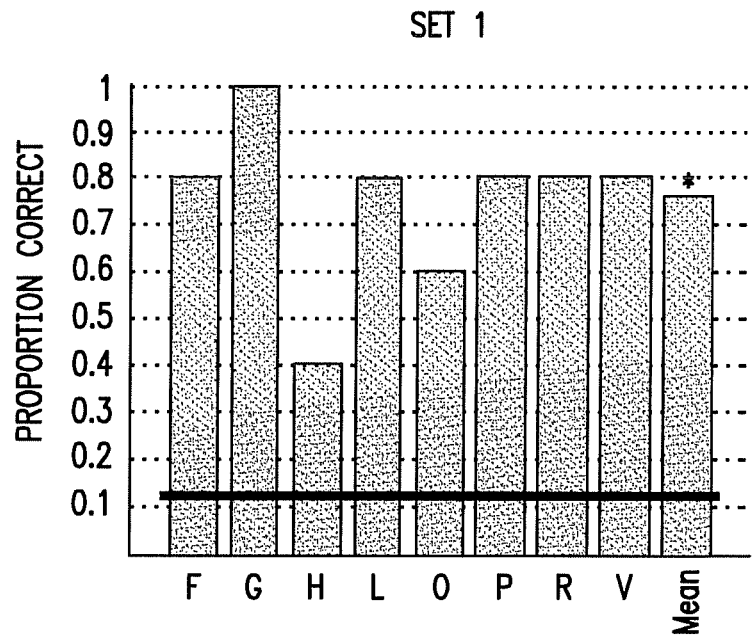
FIGS. 3A-3D are bar graphs, which shows a patient's ability to identify braille letters.
Figure 3B:
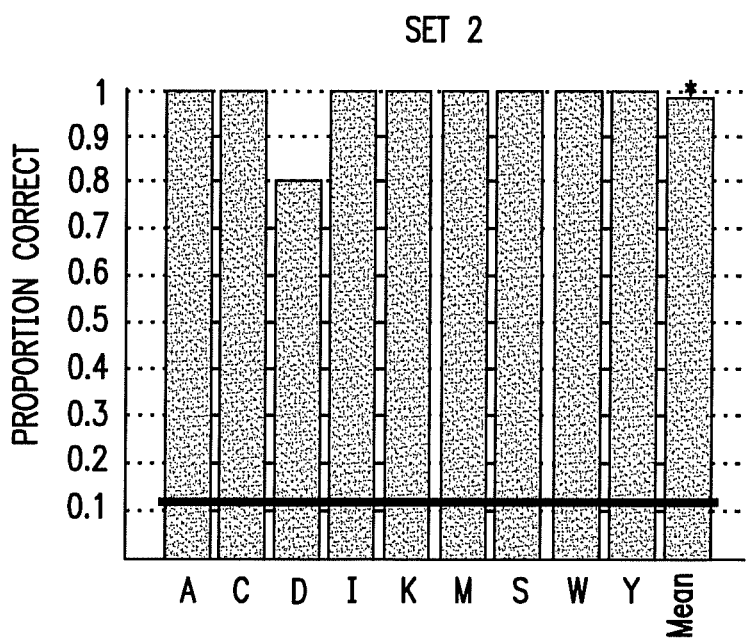
Figure 3C:
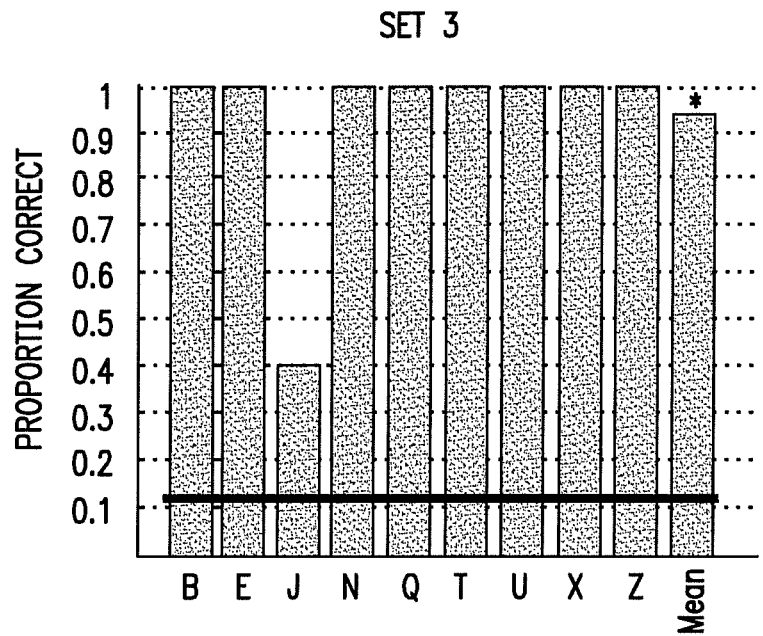
Figure 3D:
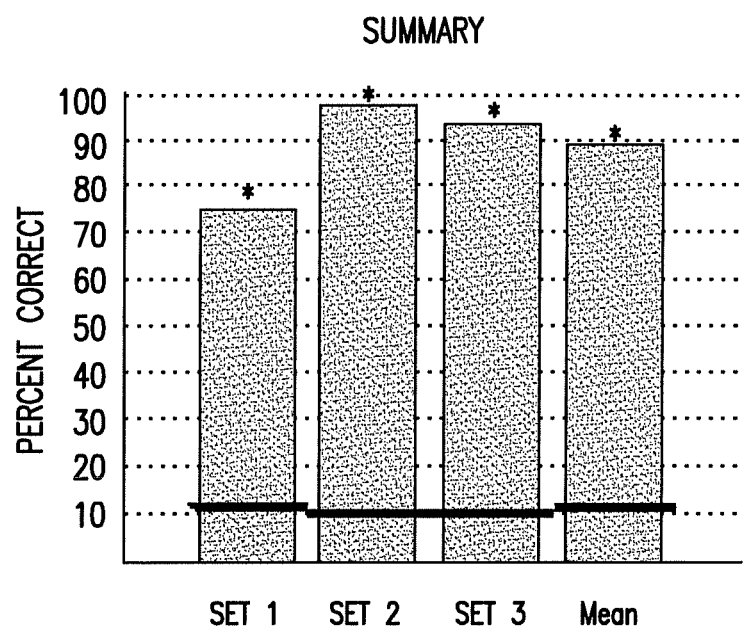
Figure 3E:
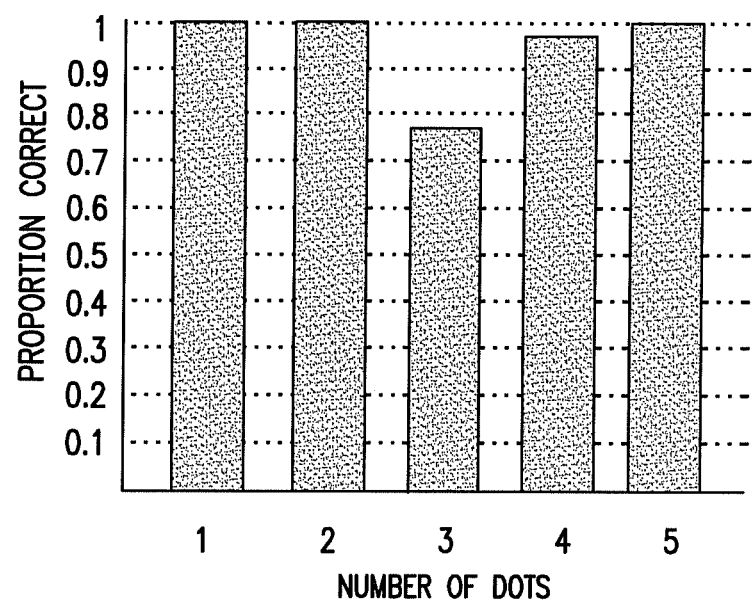
FIG. 3E is a bar graph showing the patient's ability to identify braille letters as a function of letter complexity.

While the complexity of letters varies, there is no indication that performance depended on the complexity of letters, measured as the number of dots in a letter (FIG. 3E).

Figure 4A:
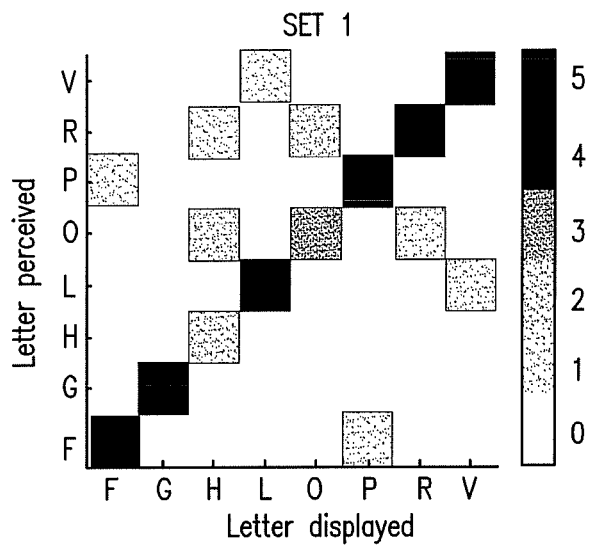
FIG. 4A-4C are graphs showing error matrices.
Figure 4B:
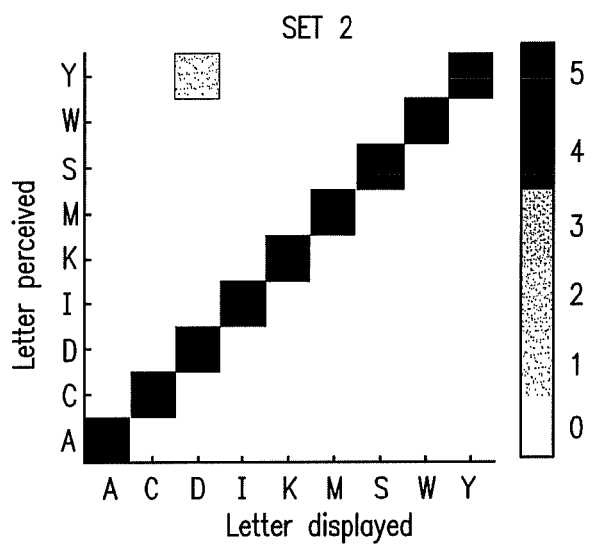
Figure 4C:
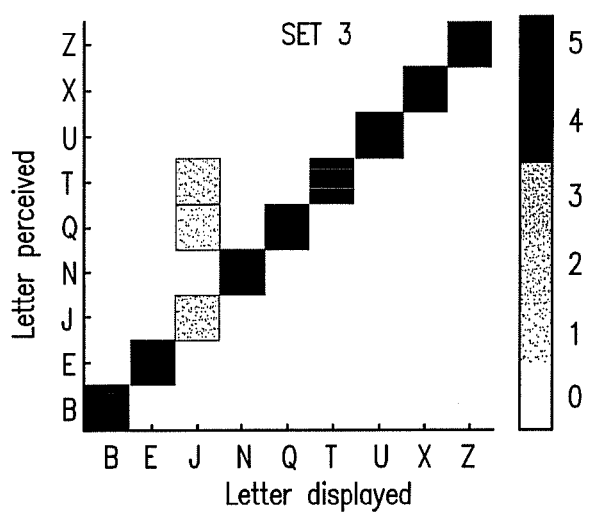
Figure 5:
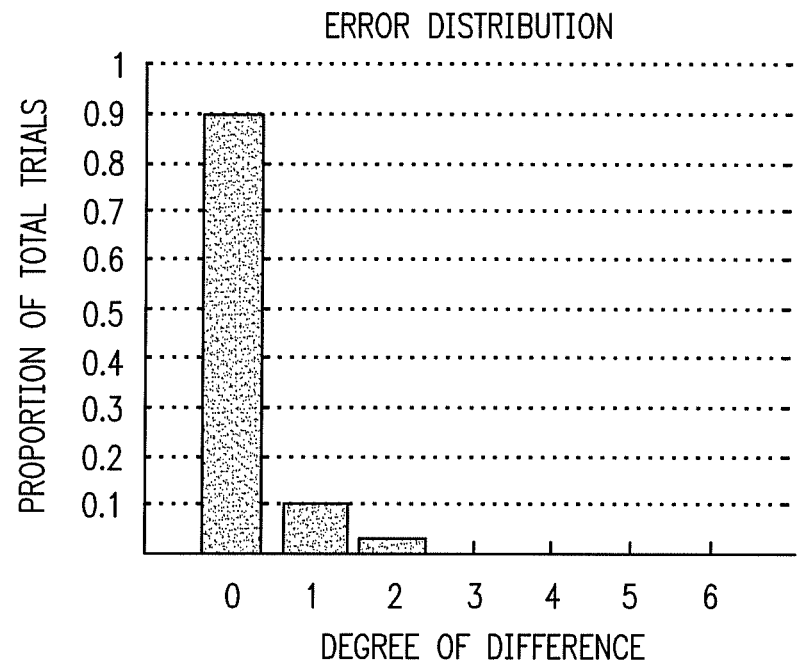
FIG. 5 is a bar graph showing degree of error in recognizing single letters.

Error matrices show the perceived letter as a function of the displayed letter (FIG. 4A-4C). There is no systematic error in misperceived letters. To determine a degree of error, the perception errors were scored the perception by adding a point for each extra perceived dot, missed dot or dot perceived in a wrong location. Zero degree error is a correct perception (89%) and the maximum possible number of errors with a 6-dot basis is 6 degrees of error. Nine percent (9%) of the perceptions had one degree of error (82% of all errors), 2% had two degrees of error (18% of all errors), and there were no higher errors (FIG. 5).

Figure 6:
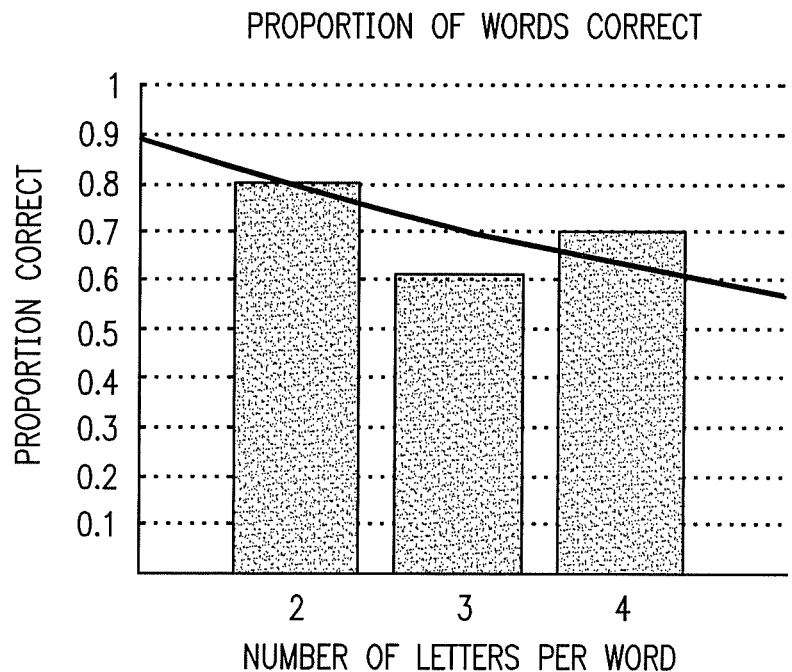
FIG. 6 is a bar graph showing recognition of braille words.

The subject was presented ten 2-, 3- and 4-letter words and correctly identified eight, six and seven words respectively (FIG. 6). The proportion of word recognition was highly significant based on random letter presentation. (For example, since the whole alphabet was available, chance of a 2-letter word is $1/26^2 = 0.0015$). The proportion of word recognition is not significantly different from what would be predicted by the single letter recognition proportion ($0.89^{[word\ length]}$) (FIG. 6). 89% is the average proportion correct from 8 and 9 AFC experiments. It is reasonable to expect the number is similar in a 26 AFC task (ignoring the use-frequency of individual letters in regular text).

This work shows that a visual prosthesis user can read both single letters and short words in visually stimulated braille. The subject recognized 89% of presented letters. Eighty-two percent (82%) of errors were due to a single dot misperception, and there is no indication that the complexity of the letter played a role in perception. The subject also identified 80% of 2-, 60% of 3-, and 70% of 4-letter words. It is reasonable to expect the performance will improve with training. This opens for the possibility of visual prosthesis users to read text by making a sensory substitution to visual braille.

Figures 3, 14:
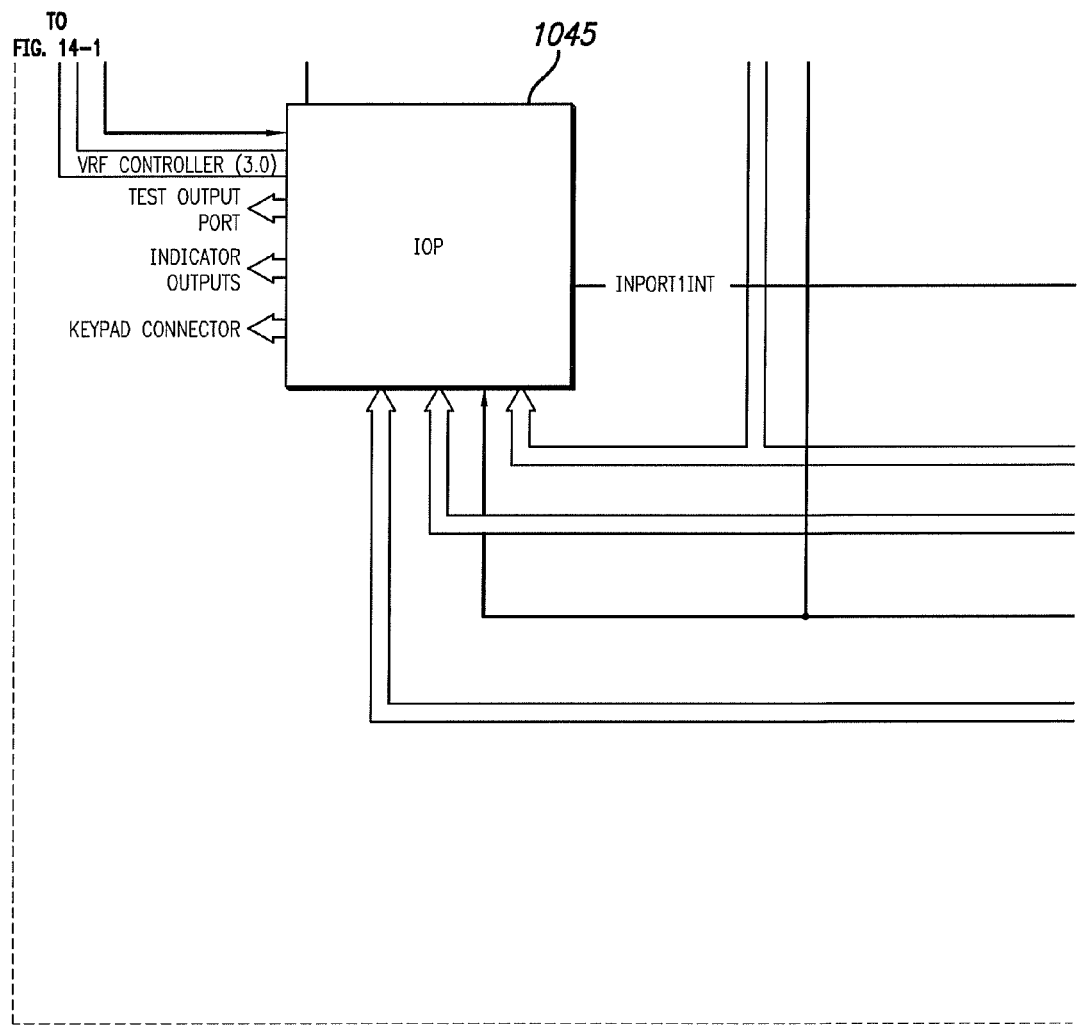
Figures 4, 14:
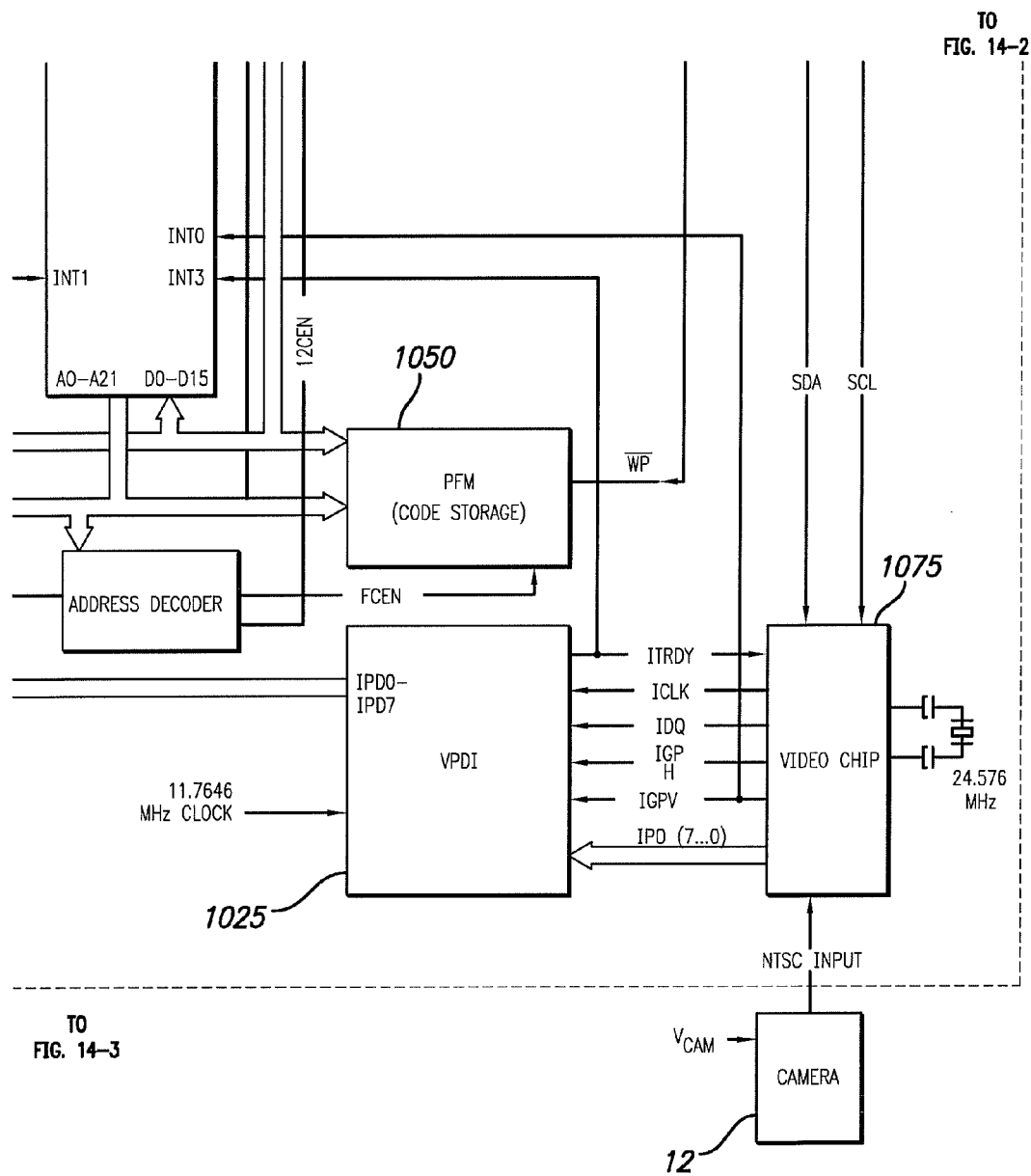
Figure 15:
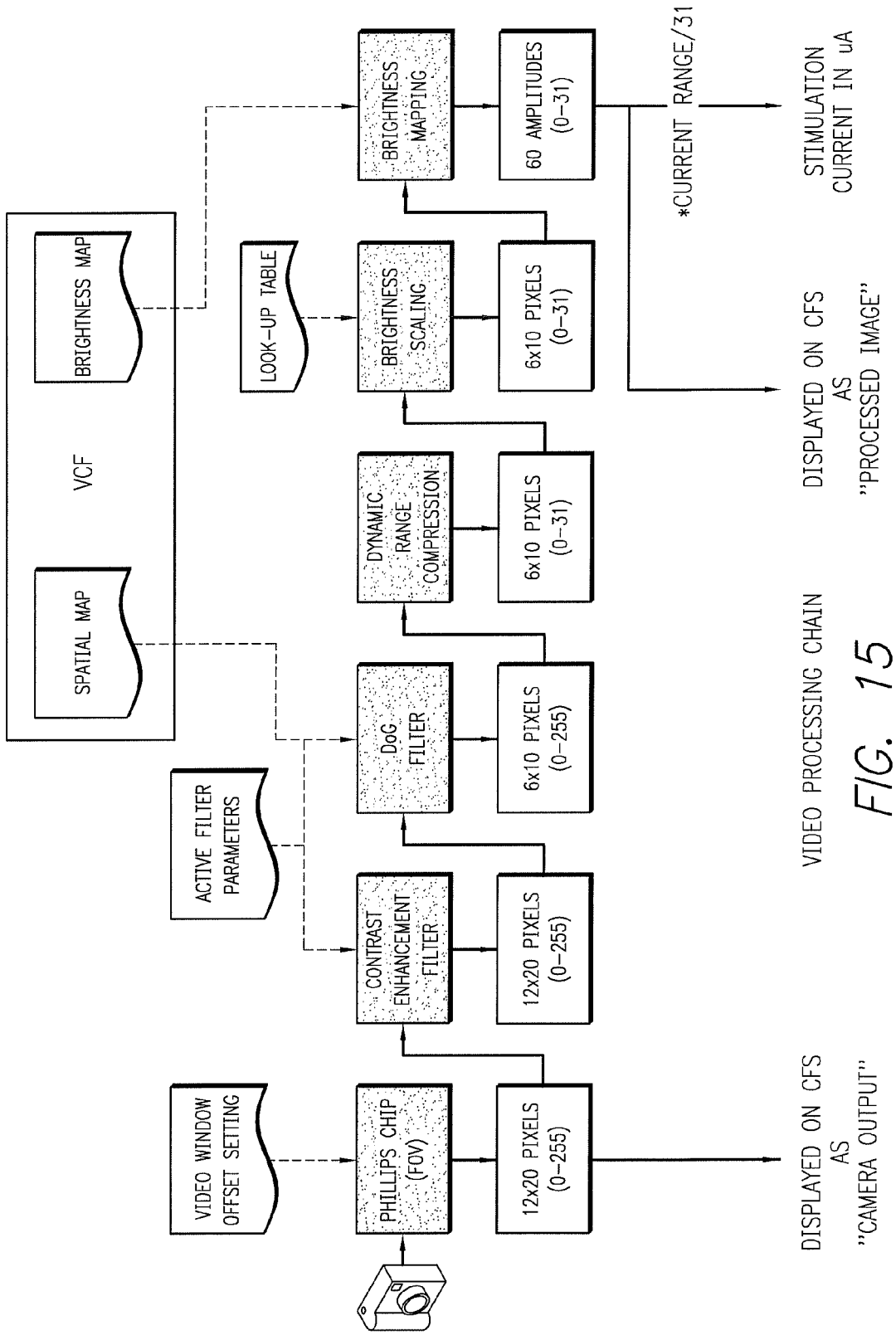
FIG. 15 is flow chart of the video processing chain in a visual prosthesis

The stimulation time used in these experiments (500 ms per letter and 1000 ms between letters) is significantly faster than the current reading speed reported with visual prostheses (tens of seconds per letter. The current study did not explore details on how stimulation time affects perception. In a short pilot experiment, we did set the stimulation time to 250 ms in a run of letter set 1, and found that the subject perceived 77.5% of the letters correctly. This is not significantly different from the 75% correct at 500 ms (FIG. 3). This indicates that it is possible to perceive visual braille at very short presentation times of down to, at least, 250 ms.

While shortening the presentation time of individual letters may increase word reading speed, we expect a limiting factor is the timing between letters and words. Recent experiments with direct stimulation in visual prostheses indicate that the persistence of a phosphene is 150-200 ms. Similarly, at frames faster than 4 s$^{-1}$, presentations tend to blur indicating that phosphenes generated by direct cortical stimulation have a similar persistence. These findings indicate that a theoretical lower limit for the interval for visual braille reading is slightly higher than 150-200 ms, say ~250 ms. If letter (and word-space) presentations are also ~250 ms, i.e. ~500 ms per letter plus space, a realistic goal for reading speed is ~120 letters per minute. This is an adequate speed for reading signs and shorter messages.

In this experiment, single letter performance was 89% correct, and performance of reading of short words aligned well with expectation based on single letter performance (FIG. 6). While the single letter performance is high, and we expect it to get better with training, a simple multiplication of probabilities would result in a larger amount of errors for just slightly longer words. But this is alleviated by the increased structure of longer words and context of sentences. For example, missing a letter in the word 'restaurant' does not alter it to something unrecognizable.

Implementing a visual braille function in prosthetic vision requires implementing optical character recognition software for reading text in the VPU. Such software is common use and Open Source codes are available. Further, the user will need to read visual braille. Only about 10% of blind people read tactile braille. But reading visual braille can be learned despite the ability to read tactile braille.

The present invention can be implemented in multiple ways depending of the skills of the user and the resolution of the electrode array. A user can simply press a button that shifts the visual prosthesis into braille reading mode, or the system can replace letters in a visual scene by overlaying braille characters.

Figure 7:
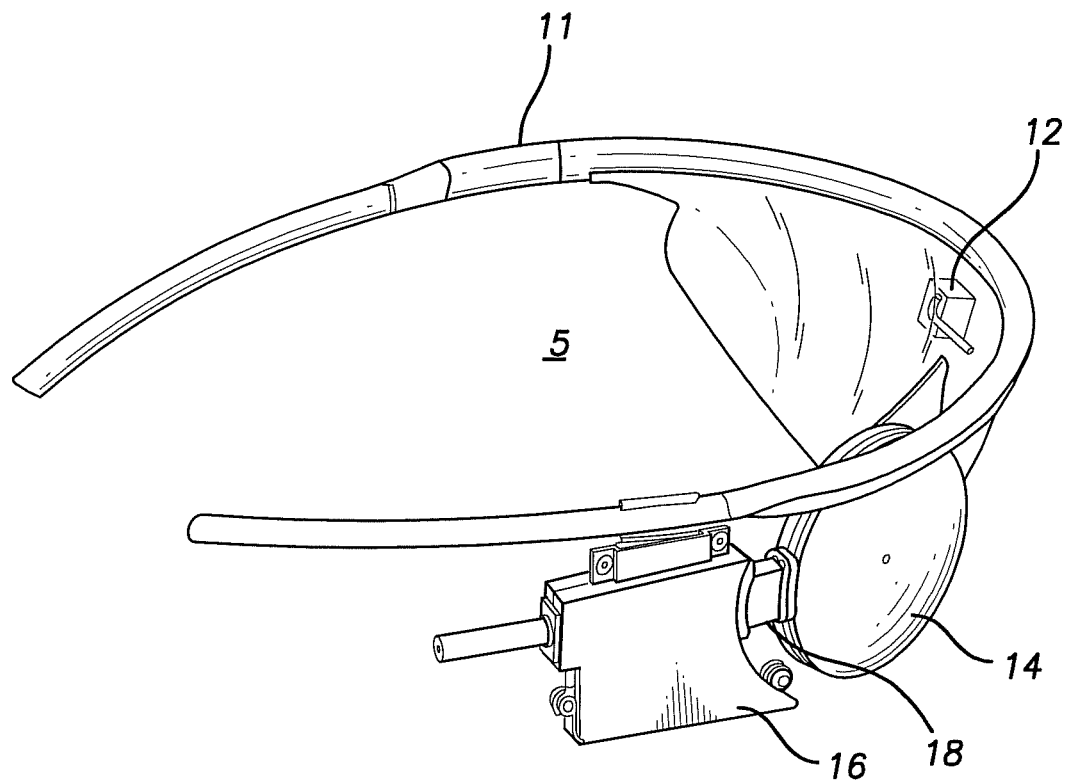
FIGS. 7 and 8 show a video capture/transmission apparatus or visor adapted to be used in combination with the retinal stimulation of FIGS. 16 and 17.
Figure 8:
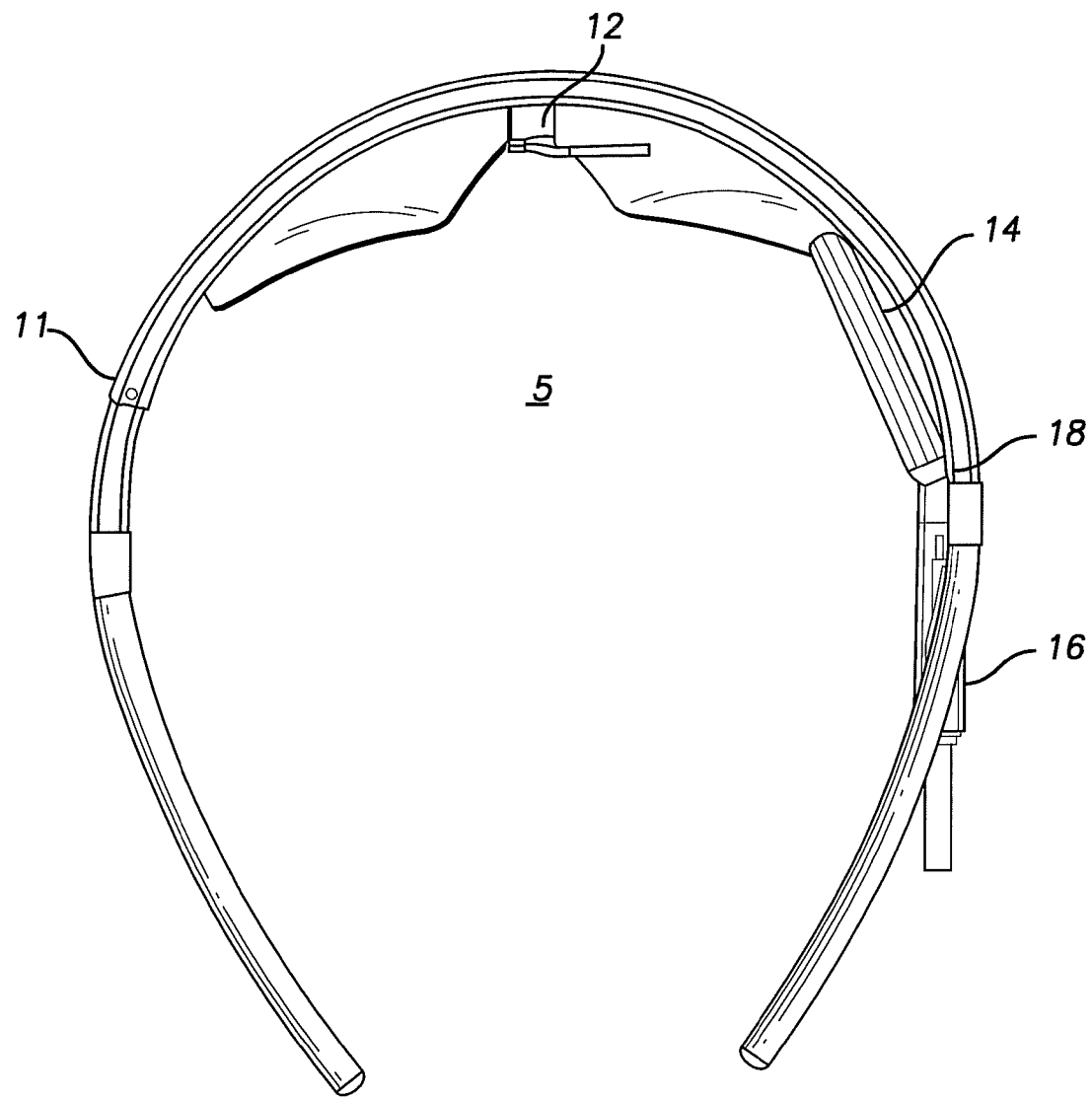

The visual prosthesis used to stimulate vision, including braille letters is described in more detail below. Referring to FIGS. 7 and 8, the glasses 5 may comprise, for example, a frame 11 holding a camera 12, an external coil 14 and a mounting system 16 for the external coil 14. The mounting system 16 may also enclose the RF circuitry. In this configuration, the video camera 12 captures live video. The video signal is sent to an external Video Processing Unit (VPU) 20 (shown in FIGS. 9, 11 and 12 and discussed below), which processes the video signal and subsequently transforms the processed video signal into electrical stimulation patterns or data. The electrical stimulation data are then sent to the external coil 14 that sends both data and power via radio-frequency (RF) telemetry to the coil 2016 of the retinal stimulation system, shown in FIGS. 16 and 17. The coil 116 receives the RF commands which control the application specific integrated circuit (ASIC) which in turn delivers stimulation to the retina of the subject via a thin film electrode array (TFEA). In one aspect of an embodiment, light amplitude is recorded by the camera 12. The VPU 20 may use a logarithmic encoding scheme to convert the incoming light amplitudes into the electrical stimulation patterns or data. These electrical stimulation patterns or data may then be passed on to the Retinal Stimulation System, which results in the retinal cells being stimulated via the electrodes in the electrode array 2010 (shown in FIG. 16). In one exemplary embodiment, the electrical stimulation patterns or data being transmitted by the external coil 14 is binary data. The external coil 14 may contain a receiver and transmitter antennae and a radio-frequency (RF) electronics card for communicating with the internal coil 116.

Figure 9:
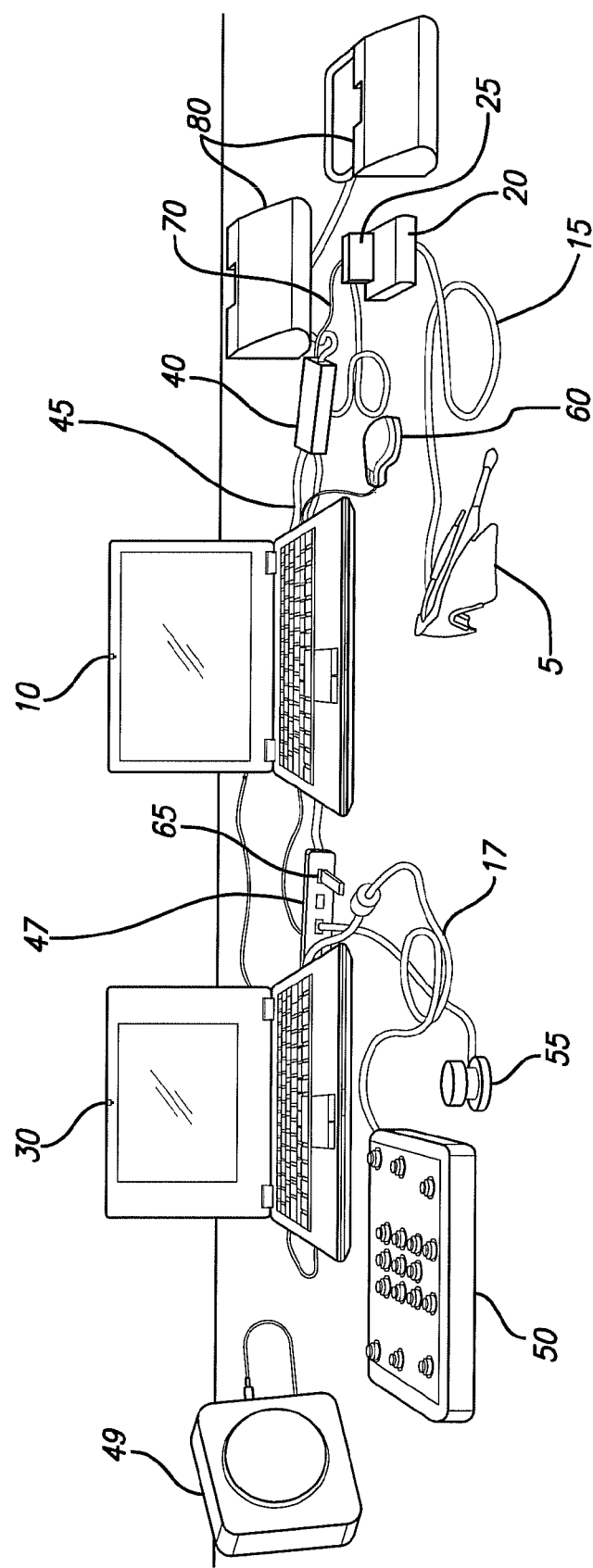
FIG. 9 shows components of a fitting system according to the present disclosure, the system also comprising the visor shown in FIGS. 6 and 7.
Figure 16:
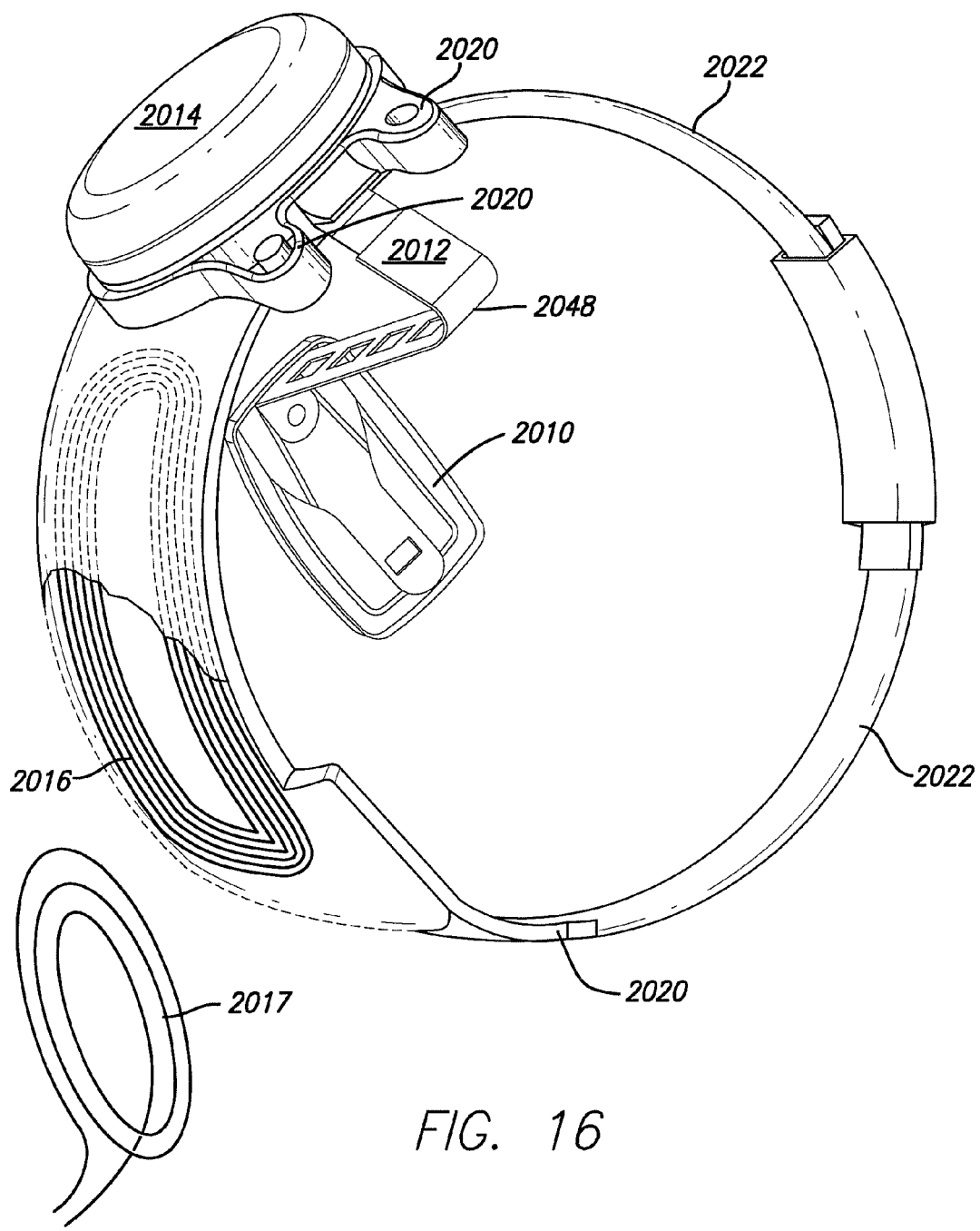
FIG. 16 is a perspective view of the implanted portion of the preferred visual prosthesis.

Referring to FIG. 9, a Fitting System (FS) may be used to configure and optimize the visual prosthesis apparatus shown in FIG. 16. The Fitting System is fully described in the related application U.S. application Ser. No. 11/796,425, filed on Apr. 27, 2007, which is incorporated herein by reference in its entirety.

The Fitting System may comprise custom software with a graphical user interface running on a dedicated laptop computer 10. Within the Fitting System are modules for performing diagnostic checks of the implant, loading and executing video configuration files, viewing electrode voltage waveforms, and aiding in conducting psychophysical experiments. A video module can be used to download a video configuration file to the Video Processing Unit (VPU) 20 discussed above and store it in non-volatile memory to control various aspects of video configuration, e.g. the spatial relationship between the video input and the electrodes. The software can also load a previously used video configuration file from the VPU 20 for adjustment.

The Fitting System can be connected to the Psychophysical Test System (PTS), located for example on a dedicated laptop 30, in order to run psychophysical experiments. In psychophysics mode, the Fitting System enables individual electrode control, permitting clinicians to construct test stimuli with control over current amplitude, pulse-width, and frequency of the stimulation. In addition, the psychophysics module allows the clinician to record subject responses. The PTS may include a collection of standard psychophysics experiments developed using for example MATLAB® (MathWorks)™ software and other tools to allow the clinicians to develop customized psychophysics experiment scripts.

Using the psychophysics module, important perceptual parameters such as perceptual threshold, maximum comfort level, and spatial location of percepts may be reliably measured. Based on these perceptual parameters, the fitting software enables custom configuration of the transformation between video image and spatio-temporal electrode stimulation parameters in an effort to optimize the effectiveness of the visual prosthesis for each subject.

The Fitting System laptop 10 of FIG. 9 may be connected to the VPU 20 using an optically isolated serial connection adapter 40. Because it is optically isolated, the serial connection adapter 40 assures that no electric leakage current can flow from the Fitting System laptop 10 in the even of a fault condition.

As shown in FIG. 9, the following components may be used with the Fitting System according to the present disclosure. The Video Processing Unit (VPU) 20 for the subject being tested, a Charged Battery 25 for VPU 20, the Glasses 5, a Fitting System (FS) Laptop 10, a Psychophysical Test System (PTS) Laptop 30, a PTS CD (not shown), a Communication Adapter (CA) 40, a USB Drive (Security) (not shown), a USB Drive (Transfer) 47, a USB Drive (Video Settings) (not shown), a Patient Input Device (RF Tablet) 50, a further Patient Input Device (Jog Dial) 55, Glasses Cable 15, CA-VPU Cable 70, FS-CA Cable 45, FS-PTS Cable 46, Four (4) Port USB Hub 47, Mouse 60, Test Array system 80, Archival USB Drive 49, an Isolation Transformer (not shown), adapter cables (not shown), and an External Monitor (not shown).

With continued reference to FIG. 9, the external components of the Fitting System may be configured as follows. The battery 25 is connected with the VPU 20. The PTS Laptop 30 is connected to FS Laptop 10 using the FS-PTS Cable 46. The PTS Laptop 30 and FS Laptop 10 are plugged into the Isolation Transformer (not shown) using the Adapter Cables (not shown). The Isolation Transformer is plugged into the wall outlet. The four (4) Port USB Hub 47 is connected to the FS laptop 10 at the USB port. The mouse 60 and the two Patient Input Devices 50 and 55 are connected to four (4) Port USB Hubs 47. The FS laptop 10 is connected to the Communication Adapter (CA) 40 using the FS-CA Cable 45. The CA 40 is connected to the VPU 20 using the CA-VPU Cable 70. The Glasses 5 are connected to the VPU 20 using the Glasses Cable 15.

In one exemplary embodiment, the Fitting System shown in FIG. 9 may be used to configure system stimulation parameters and video processing strategies for each subject outfitted with the visual prosthesis apparatus. The fitting application, operating system, laptops 10 and 30, isolation unit and VPU 20 may be tested and configuration controlled as a system. The software provides modules for electrode control, allowing an interactive construction of test stimuli with control over amplitude, pulse width, and frequency of the stimulation waveform of each electrode in the Retinal stimulation system. These parameters are checked to ensure that maximum charge per phase limits, charge balance, and power limitations are met before the test stimuli are presented to the subject. Additionally, these parameters may be checked a second time by the VPU 20's firmware. The Fitting System shown in FIG. 9 may also provide a psychophysics module for administering a series of previously determined test stimuli to record subject's responses. These responses may be indicated by a keypad 50 and or verbally. The psychophysics module may also be used to reliably measure perceptual parameters such as perceptual threshold, maximum comfort level, and spatial location of percepts. These perceptual parameters may be used to custom configure the transformation between the video image and spatio-tempral electrode stimulation parameters thereby optimizing the effectiveness of the visual prosthesis for each subject. The Fitting System is fully described in the related application U.S. application Ser. No. 11/796,425, filed on Apr. 27, 2007, which is incorporated herein by reference in its entirety.

Figure 10:
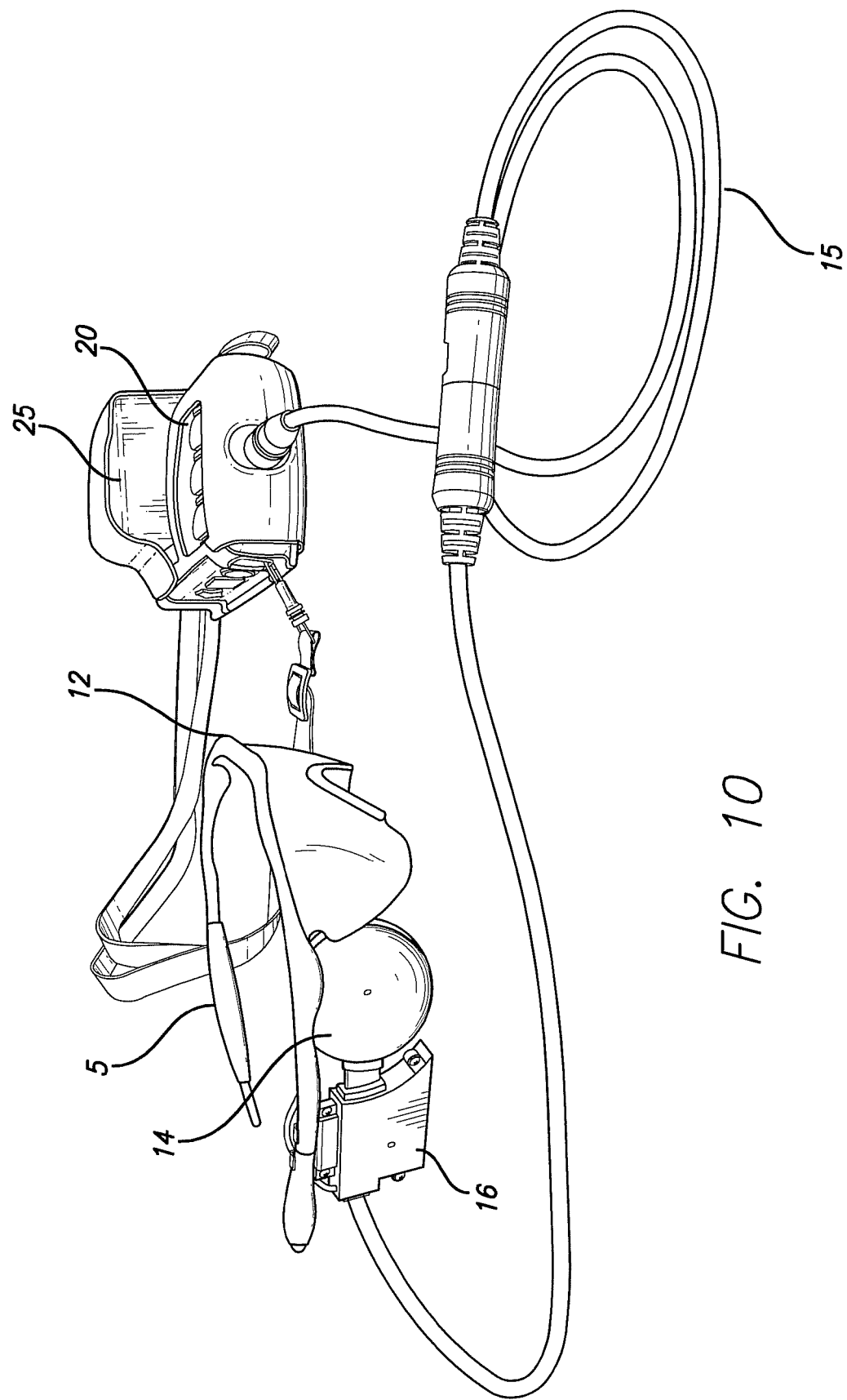
FIG. 10 shows the external portion of the visual prosthesis apparatus in a stand-alone mode, i.e. comprising the visor connected to a video processing unit.

The visual prosthesis apparatus may operate in two modes: i) stand-alone mode and ii) communication mode Stand-Alone Mode Referring to FIG. 10, in the stand-alone mode, the video camera 12, on the glasses 5, captures a video image that is sent to the VPU 20. The VPU 20 processes the image from the camera 12 and transforms it into electrical stimulation patterns that are transmitted to the external coil 14. The external coil 14 sends the electrical stimulation patterns and power via radio-frequency (RF) telemetry to the implanted retinal stimulation system. The internal coil 116 of the retinal stimulation system receives the RF commands from the external coil 14 and transmits them to the electronics package 4 that in turn delivers stimulation to the retina via the electrode array 2. Additionally, the retinal stimulation system may communicate safety and operational status back to the VPU 20 by transmitting RF telemetry from the internal coil 116 to the external coil 14. The visual prosthesis apparatus of FIG. 1 may be configured to electrically activate the retinal stimulation system only when it is powered by the VPU 20 through the external coil 14. The stand-alone mode may be used for clinical testing and/or at-home use by the subject.

Communication Mode

The communication mode may be used for diagnostic testing, psychophysical testing, patient fitting and downloading of stimulation settings to the VPU 20 before transmitting data from the VPU 20 to the retinal stimulation system as is done for example in the stand-alone mode described above. Referring to FIG. 9, in the communication mode, the VPU 20 is connected to the Fitting System laptop 10 using cables 70, 45 and the optically isolated serial connection adapter 40. In this mode, laptop 10 generated stimuli may be presented to the subject and programming parameters may be adjusted and downloaded to the VPU 20. The Psychophysical Test System (PTS) laptop 30 connected to the Fitting System laptop 10 may also be utilized to perform more sophisticated testing and analysis as fully described in the related application U.S. application Ser. No. 11/796,425, filed on Apr. 27, 2007, which is incorporated herein by reference in its entirety.

In one embodiment, the functionality of the retinal stimulation system can also be tested pre-operatively and intra-operatively (i.e. before operation and during operation) by using an external coil 14, without the glasses 5, placed in close proximity to the retinal stimulation system. The coil 14 may communicate the status of the retinal stimulation system to the VPU 20 that is connected to the Fitting System laptop 10 as shown in FIG. 9.

As discussed above, the VPU 20 processes the image from the camera 12 and transforms the image into electrical stimulation patterns for the retinal stimulation system. Filters such as edge detection filters may be applied to the electrical stimulation patterns for example by the VPU 20 to generate, for example, a stimulation pattern based on filtered video data that the VPU 20 turns into stimulation data for the retinal stimulation system. The images may then be reduced in resolution using a downscaling filter. In one exemplary embodiment, the resolution of the image may be reduced to match the number of electrodes in the electrode array 2010 (FIG. 16) of the retinal stimulation system. That is, if the electrode array has, for example, sixty electrodes, the image may be reduced to a sixty channel resolution. After the reduction in resolution, the image is mapped to stimulation intensity using for example a look-up table that has been derived from testing of individual subjects. Then, the VPU 20 transmits the stimulation parameters via forward telemetry to the retinal stimulation system in frames that may employ a cyclic redundancy check (CRC) error detection scheme.

Figure 11:
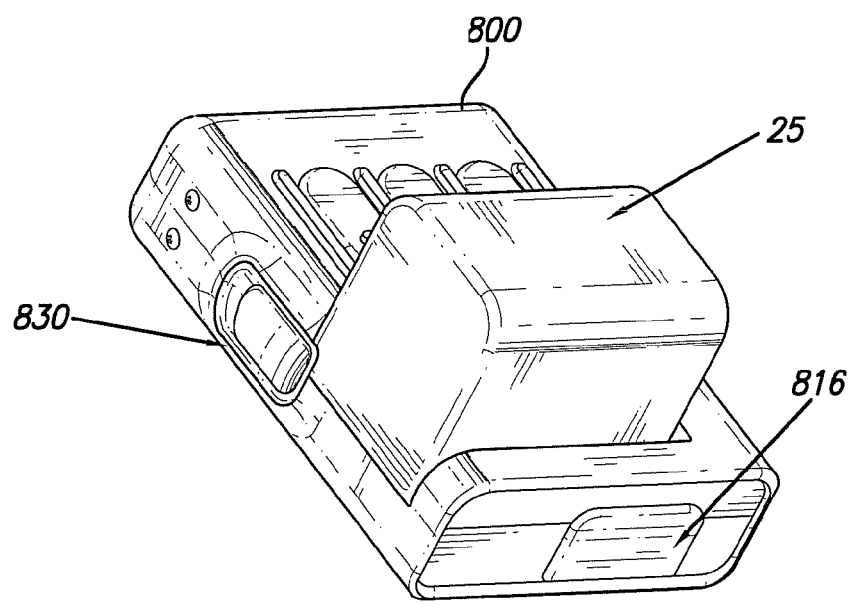
FIGS. 11-12 show the video processing unit in more detail already briefly shown with reference to FIGS. 9 and 10.
Figure 12:
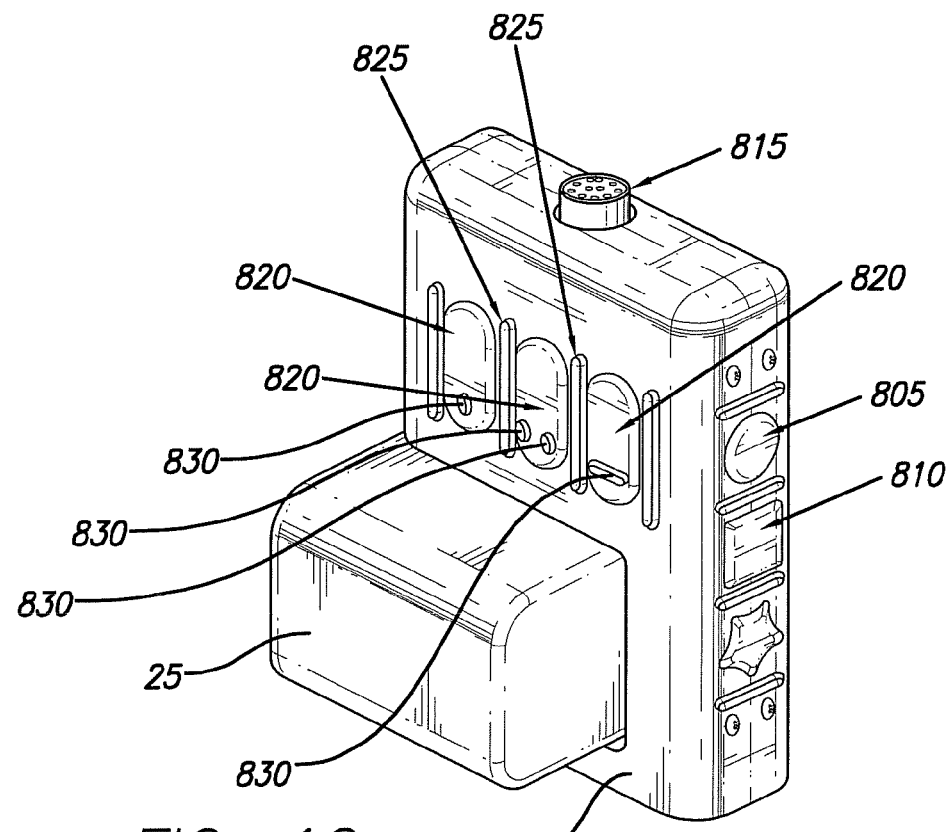

In one exemplary embodiment, the VPU 20 may be configured to allow the subject/patient i) to turn the visual prosthesis apparatus on and off, ii) to manually adjust settings, and iii) to provide power and data to the retinal stimulation system. Referring to FIGS. 11 and 12, the VPU 20 may comprise a case 800, power button 805 for turning the VPU 20 on and off, setting button 810, zoom buttons 820 for controlling the camera 12, connector port 815 for connecting to the Glasses 5, a connector port 816 for connecting to the laptop 10 through the connection adapter 40, indicator lights 825 to give visual indication of operating status of the system, the rechargeable battery 25 for powering the VPU 20, battery latch 830 for locking the battery 25 in the case 800, digital circuit boards (not shown), and a speaker (not shown) to provide audible alerts to indicate various operational conditions of the system. Because the VPU 20 is used and operated by a person with minimal or no vision, the buttons on the VPU 20 may be differently shaped and/or have special markings as shown in FIG. 12 to help the user identify the functionality of the button without having to look at it. As shown in FIG. 12, the power button 805 may be a circular shape while the settings button 820 may be square shape and the zoom buttons 820 may have special raised markings 830 to also identify each buttons functionality. One skilled in the art would appreciate that other shapes and markings can be used to identify the buttons without departing from the spirit and scope of the invention. For example, the markings can be recessed instead of raised.

Any of the buttons can 820 can be designated for braille reading mode. Alternatively, a button can serve multiple purposes dependent on detection of letters. As an example a button 820 may normally provide contrast function. Upon detection of letters in the visual scene, the system can prompt the user, through sound or stimulation patterns, of the availability of letters to read and reassign the contrast button to reading mode. The button then reverts to contrast mode when the letters are no longer available or after a predetermined time.

In one embodiment, the indicator lights 825 may indicate that the VPU 20 is going through system start-up diagnostic testing when the one or more indicator lights 825 are blinking fast (more then once per second) and are green in color. The indicator lights 825 may indicate that the VPU 20 is operating normally when the one or more indicator lights 825 are blinking once per second and are green in color. The indicator lights 825 may indicate that the retinal stimulation system has a problem that was detected by the VPU 20 at start-up diagnostic when the one or more indicator lights 825 are blinking for example once per five second and are green in color. The indicator lights 825 may indicate that the video signal from camera 12 is not being received by the VPU 20 when the one or more indicator lights 825 are always on and are amber color. The indicator lights 825 may indicate that there is a loss of communication between the retinal stimulation system and the external coil 14 due to the movement or removal of Glasses 5 while the system is operational or if the VPU 20 detects a problem with the retinal stimulation system and shuts off power to the retinal stimulation system when the one or more indicator lights 825 are always on and are orange color. One skilled in the art would appreciate that other colors and blinking patterns can be used to give visual indication of operating status of the system without departing from the spirit and scope of the invention.

In one embodiment, a single short beep from the speaker (not shown) may be used to indicate that one of the buttons 825, 805 or 810 have been pressed. A single beep followed by two more beeps from the speaker (not shown) may be used to indicate that VPU 20 is turned off. Two beeps from the speaker (not shown) may be used to indicate that VPU 20 is starting up. Three beeps from the speaker (not shown) may be used to indicate that an error has occurred and the VPU 20 is about to shut down automatically. As would be clear to one skilled in the are different periodic beeping may also be used to indicate a low battery voltage warning, that there is a problem with the video signal, and/or there is a loss of communication between the retinal stimulation system and the external coil 14. One skilled in the art would appreciate that other sounds can be used to give audio indication of operating status of the system without departing from the spirit and scope of the invention. For example, the beeps may be replaced by an actual prerecorded voice indicating operating status of the system.

In one exemplary embodiment, the VPU 20 is in constant communication with the retinal stimulation system through forward and backward telemetry. In this document, the forward telemetry refers to transmission from VPU 20 to the retinal stimulation system and the backward telemetry refers to transmissions from the Retinal stimulation system to the VPU 20. During the initial setup, the VPU 20 may transmit null frames (containing no stimulation information) until the VPU 20 synchronizes with the Retinal stimulation system via the back telemetry. In one embodiment, an audio alarm may be used to indicate whenever the synchronization has been lost.

In order to supply power and data to the Retinal stimulation system, the VPU 20 may drive the external coil 14, for example, with a 3 MHz signal. To protect the subject, the retinal stimulation system may comprise a failure detection circuit to detect direct current leakage and to notify the VPU 20 through back telemetry so that the visual prosthesis apparatus can be shut down.

The forward telemetry data (transmitted for example at 122.76 kHz) may be modulated onto the exemplary 3 MHz carrier using Amplitude Shift Keying (ASK), while the back telemetry data (transmitted for example at 3.8 kHz) may be modulated using Frequency Shift Keying (FSK) with, for example, 442 kHz and 457 kHz. The theoretical bit error rates can be calculated for both the ASK and FSK scheme assuming a ratio of signal to noise (SNR). The system disclosed in the present disclosure can be reasonably expected to see bit error rates of 10-5 on forward telemetry and 10-3 on back telemetry. These errors may be caught more than 99.998% of the time by both an ASIC hardware telemetry error detection algorithm and the VPU 20's firmware. For the forward telemetry, this is due to the fact that a 16-bit cyclic redundancy check (CRC) is calculated for every 1024 bits sent to the ASIC within electronics package 4 of the Retinal Stimulation system. The ASIC of the Retinal Stimulation system verifies this CRC and handles corrupt data by entering a non-stimulating 'safe' state and reporting that a telemetry error was detected to the VPU 20 via back telemetry. During the 'safe' mode, the VPU 20 may attempt to return the implant to an operating state. This recovery may be on the order of milliseconds. The back telemetry words are checked for a 16-bit header and a single parity bit. For further protection against corrupt data being misread, the back telemetry is only checked for header and parity if it is recognized as properly encoded Bi-phase Mark Encoded (BPM) data. If the VPU 20 detects invalid back telemetry data, the VPU 20 immediately changes mode to a 'safe' mode where the Retinal Stimulation system is reset and the VPU 20 only sends non-stimulating data frames. Back telemetry errors cannot cause the VPU 20 to do anything that would be unsafe.

Figure 13A:
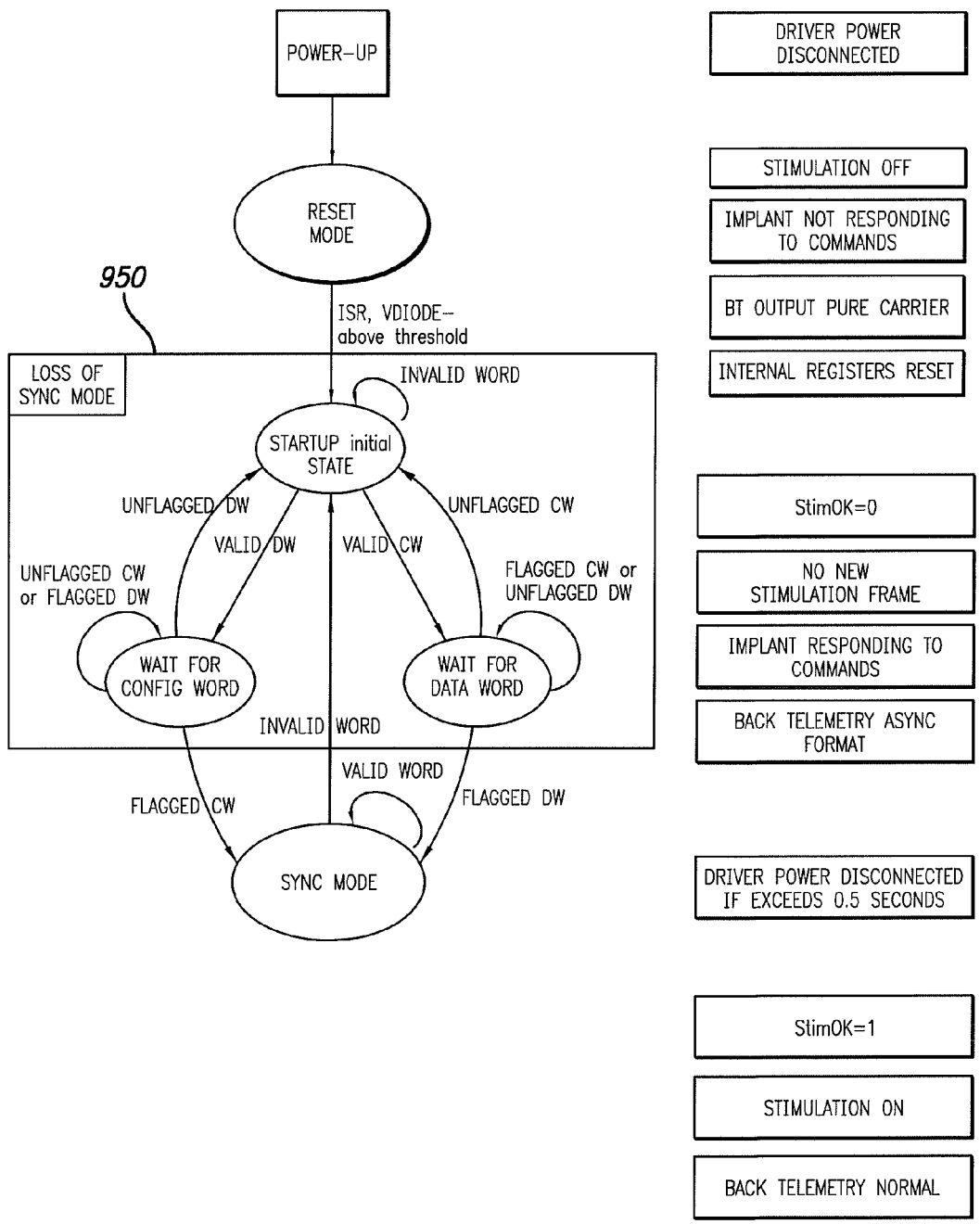
FIG. 13a shows a LOSS OF SYNC mode.

The response to errors detected in data transmitted by VPU 20 may begin at the ASIC of the Retinal Stimulation system. The Retinal Stimulation system may be constantly checking the headers and CRCs of incoming data frames. If either the header or CRC check fails, the ASIC of the Retinal Stimulation system may enter a mode called LOSS OF SYNC 950, shown in FIG. 13*a*. In LOSS OF SYNC mode 950, the Retinal Stimulation system will no longer produce a stimulation output, even if commanded to do so by the VPU 20. This cessation of stimulation occurs after the end of the stimulation frame in which the LOSS OF SYNC mode 950 is entered, thus avoiding the possibility of unbalanced pulses not completing stimulation. If the Retinal Stimulation system remains in a LOSS OF SYNC mode 950 for 1 second or more (for example, caused by successive errors in data transmitted by VPU 20), the ASIC of the Retinal Stimulation system disconnects the power lines to the stimulation pulse drivers. This eliminates the possibility of any leakage from the power supply in a prolonged LOSS OF SYNC mode 950. From the LOSS OF SYNC mode 950, the Retinal Stimulation system will not re-enter a stimulating mode until it has been properly initialized with valid data transmitted by the VPU 20.

In addition, the VPU 20 may also take action when notified of the LOSS OF SYNC mode 950. As soon as the Retinal Stimulation system enters the LOSS OF SYNC mode 950, the Retinal Stimulation system reports this fact to the VPU 20 through back telemetry. When the VPU 20 detects that the Retinal Stimulation system is in LOSS OF SYNC mode 950, the VPU 20 may start to send 'safe' data frames to the Retinal Stimulation system. 'Safe' data is data in which no stimulation output is programmed and the power to the stimulation drivers is also programmed to be off. The VPU 20 will not send data frames to the Retinal Stimulation system with stimulation commands until the VPU 20 first receives back telemetry from the Retinal Stimulation system indicating that the Retinal Stimulation system has exited the LOSS OF SYNC mode 950. After several unsuccessful retries by the VPU 20 to take the implant out of LOSS OF SYNC mode 950, the VPU 20 will enter a Low Power Mode (described below) in which the implant is only powered for a very short time. In this time, the VPU 20 checks the status of the implant. If the implant continues to report a LOSS OF SYNC mode 950, the VPU 20 turns power off to the Retinal Stimulation system and tries again later. Since there is no possibility of the implant electronics causing damage when it is not powered, this mode is considered very safe.

Due to an unwanted electromagnetic interference (EMI) or electrostatic discharge (ESD) event the VPU 20 data, specifically the VPU firmware code, in RAM can potentially get corrupted and may cause the VPU 20 firmware to freeze. As a result, the VPU 20 firmware will stop resetting the hardware watchdog circuit, which may cause the system to reset. This will cause the watchdog timer to expire causing a system reset in, for example, less than 2.25 seconds. Upon recovering from the reset, the VPU 20 firmware logs the event and shuts itself down. VPU 20 will not allow system usage after this occurs once. This prevents the VPU 20 code from freezing for extended periods of time and hence reduces the probability of the VPU sending invalid data frames to the implant.

Supplying power to the Retinal stimulation system can be a significant portion of the VPU 20's total power consumption. When the Retinal stimulation system is not within receiving range to receive either power or data from the VPU 20, the power used by the VPU 20 is wasted.

Power delivered to the Retinal stimulation system may be dependant on the orientation of the coils 14 and 116. The power delivered to the Retinal stimulation system may be controlled, for example, via the VPU 20 every 16.6 ms. The Retinal stimulation system may report how much power it receives and the VPU 20 may adjust the power supply voltage of the RF driver to maintain a required power level on the Retinal stimulation system. Two types of power loss may occur: 1) long term (>~1 second) and 2) short term (<~1 second). The long term power loss may be caused, for example, by a subject removing the Glasses 5.

Figure 13B:
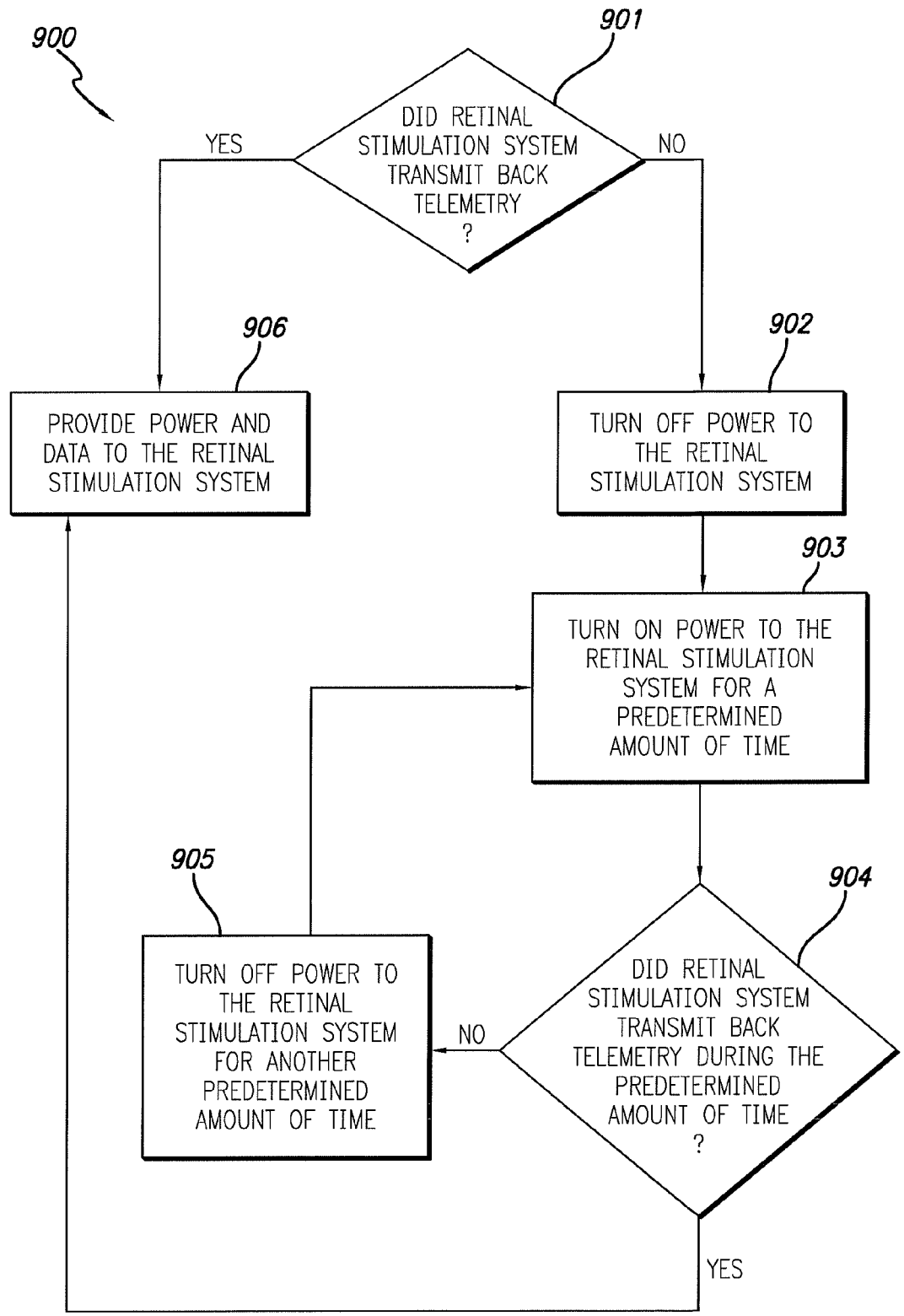
FIG. 13b shows an exemplary block diagram of the steps taken when VPU does not receive back telemetry from the Retinal stimulation system.

In one exemplary embodiment, the Low Power Mode may be implemented to save power for VPU 20. The Low Power Mode may be entered, for example, anytime the VPU 20 does not receive back telemetry from the Retinal stimulation system. Upon entry to the Low Power Mode, the VPU 20 turns off power to the Retinal stimulation system. After that, and periodically, the VPU 20 turns power back on to the Retinal stimulation system for an amount of time just long enough for the presence of the Retinal stimulation system to be recognized via its back telemetry. If the Retinal stimulation system is not immediately recognized, the controller again shuts off power to the Retinal stimulation system. In this way, the controller 'polls' for the passive Retinal stimulation system and a significant reduction in power used is seen when the Retinal stimulation system is too far away from its controller device. FIG. 13*b* depicts an exemplary block diagram 900 of the steps taken when the VPU 20 does not receive back telemetry from the Retinal stimulation system. If the VPU 20 receives back telemetry from the Retinal stimulation system (output "YES" of step 901), the Retinal stimulation system may be provided with power and data (step 906). If the VPU 20 does not receive back telemetry from the Retinal stimulation system (output "NO" of step 901), the power to the Retinal stimulation system may be turned off. After some amount of time, power to the Retinal stimulation system may be turned on again for enough time to determine if the Retinal stimulation system is again transmitting back telemetry (step 903). If the Retinal stimulation system is again transmitting back telemetry (step 904), the Retinal stimulation system is provided with power and data (step 906). If the Retinal stimulation system is not transmitting back telemetry (step 904), the power to the Retinal stimulation system may again be turned off for a predetermined amount of time (step 905) and the process may be repeated until the Retinal stimulation system is again transmitting back telemetry.

Figure 13C:
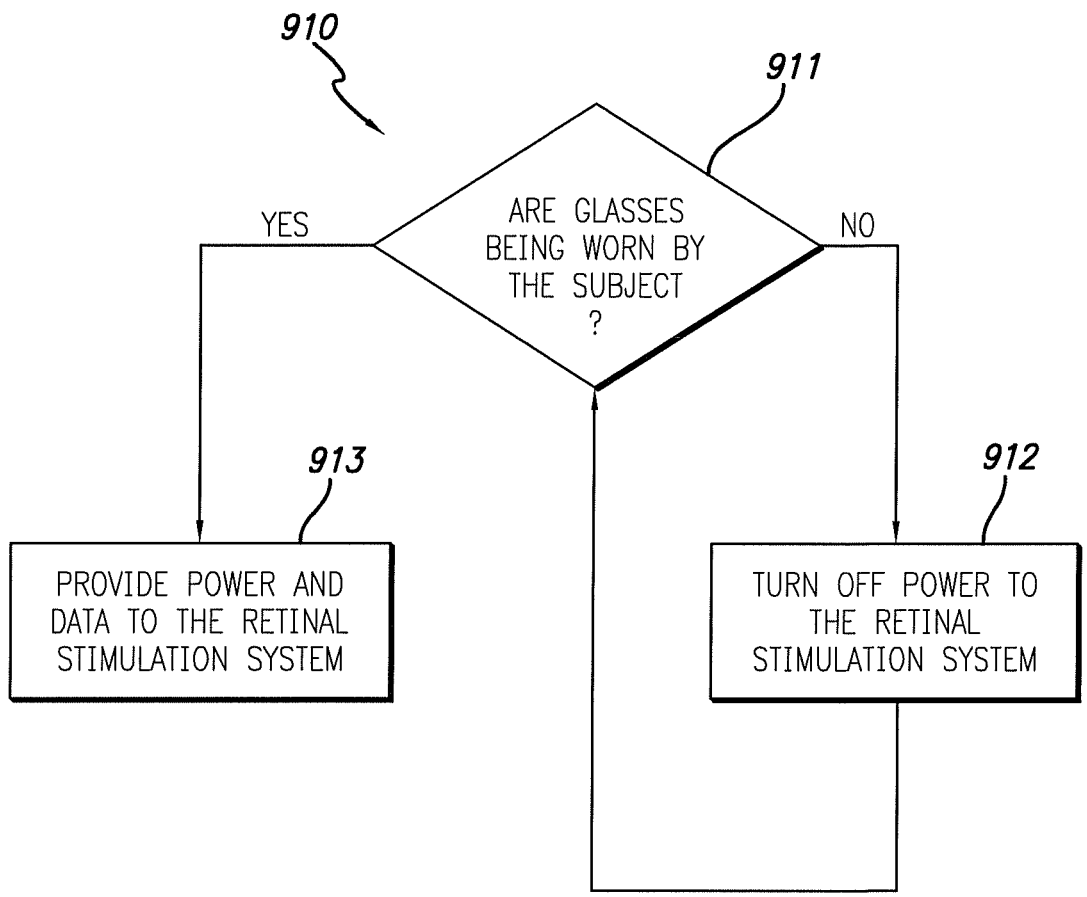
FIG. 13c shows an exemplary block diagram of the steps taken when the subject is not wearing Glasses.

In another exemplary embodiment, the Low Power Mode may be entered whenever the subject is not wearing the Glasses 5. In one example, the Glasses 5 may contain a capacitive touch sensor (not shown) to provide the VPU 20 digital information regarding whether or not the Glasses 5 are being worn by the subject. In this example, the Low Power Mode may be entered whenever the capacitive touch sensor detects that the subject is not wearing the Glasses 5. That is, if the subject removes the Glasses 5, the VPU 20 will shut off power to the external coil 14. As soon as the Glasses 5 are put back on, the VPU 20 will resume powering the external coil 14. FIG. 13*c* depicts an exemplary block diagram 910 of the steps taken when the capacitive touch sensor detects that the subject is not wearing the Glasses 5. If the subject is wearing Glasses 5 (step 911), the Retinal stimulation system is provided with power and data (step 913). If the subject is not wearing Glasses 5 (step 911), the power to the Retinal stimulation system is turned off (step 912) and the process is repeated until the subject is wearing Glasses 5.

One exemplary embodiment of the VPU 20 is shown in FIG. 14. The VPU 20 may comprise: a Power Supply, a Distribution and Monitoring Circuit (PSDM) 1005, a Reset Circuit 1010, a System Main Clock (SMC) source (not shown), a Video Preprocessor Clock (VPC) source (not shown), a Digital Signal Processor (DSP) 1020, Video Preprocessor Data Interface 1025, a Video Preprocessor 1075, an I$^2$C Protocol Controller 1030, a Complex Programmable Logic device (CPLD) (not shown), a Forward Telemetry Controller (FTC) 1035, a Back Telemetry Controller (BTC) 1040, Input/Output Ports 1045, Memory Devices like a Parallel Flash Memory (PFM) 1050 and a Serial Flash Memory (SFM) 1055, a Real Time Clock 1060, an RF Voltage and Current Monitoring Circuit (VIMC) (not shown), a speaker and/or a buzzer, an RF receiver 1065, and an RF transmitter 1070.

The Power Supply, Distribution and Monitoring Circuit (PSDM) 1005 may regulate a variable battery voltage to several stable voltages that apply to components of the VPU 20. The Power Supply, Distribution and Monitoring Circuit (PSDM) 1005 may also provide low battery monitoring and depleted battery system cutoff. The Reset Circuit 1010 may have reset inputs 1011 that are able to invoke system level rest. For example, the reset inputs 1011 may be from a manual push-button reset, a watchdog timer expiration, and/or firmware based shutdown. The System Main Clock (SMC) source is a clock source for DSP 1020 and CPLD. The Video Preprocessor Clock (VPC) source is a clock source for the Video Processor. The DSP 1020 may act as the central processing unit of the VPU 20. The DSP 1020 may communicate with the rest of the components of the VPU 20 through parallel and serial interfaces. The Video Processor 1075 may convert the NTSC signal from the camera 12 into a down-scaled resolution digital image format. The Video Processor 1075 may comprise a video decoder (not shown) for converting the NTSC signal into high-resolution digitized image and a video scaler (not shown) for scaling down the high-resolution digitized image from the video decoder to an intermediate digitized image resolution. The video decoder may be composed of an Analog Input Processing, Chrominance and Luminance Processing and Brightness Contrast and Saturation (BSC) Control circuits. The video scaler may be composed of Acquisition control, Pre-scaler, BSC-control, Line Buffer and Output Interface. The I²C Protocol Controller 1030 may serve as a link between the DSP 1020 and the I²C bus. The I²C Protocol Controller 1030 may be able to convert the parallel bus interface of the DSP 1020 to the I²C protocol bus or vise versa. The I²C Protocol Controller 1030 may also be connected to the Video Processor 1075 and the Real Time Clock 1060. The VPDI 1025 may contain a tri-state machine to shift video data from Video Preprocessor 1075 to the DSP 1020. The Forward Telemetry Controller (FTC) 1035 packs 1024 bits of forward telemetry data into a forward telemetry frame. The FTC 1035 retrieves the forward telemetry data from the DSP 1020 and converts the data from logic level to biphase marked data. The Back Telemetry Controller (BTC) 1040 retrieves the biphase marked data from the RF receiver 1065, decodes it, and generates the BFSR and BCLKR for the DSP 1020. The Input/Output Ports 1045 provide expanded 10 functions to access the CPLD on-chip and off-chip devices. The Parallel Flash Memory (PFM) 1050 may be used to store executable code and the Serial Flash Memory (SFM) 1055 may provide Serial Port Interface (SPI) for data storage. The VIMC may be used to sample and monitor RF transmitter 1070 current and voltage in order to monitor the integrity status of the retinal stimulation system.

FIG. 16 shows a perspective view of the implanted portion of the preferred visual prosthesis. A flexible circuit 2001 includes a flexible circuit electrode array 2010 which is mounted by a retinal tack (not shown) or similar means to the epiretinal surface. The flexible circuit electrode array 2010 is electrically coupled by a flexible circuit cable 2012, which pierces the sclera and is electrically coupled to an electronics package 2014, external to the sclera.

The electronics package 2014 is electrically coupled to a secondary inductive coil 2016. Preferably the secondary inductive coil 2016 is made from wound wire. Alternatively, the secondary inductive coil 2016 may be made from a flexible circuit polymer sandwich with wire traces deposited between layers of flexible circuit polymer. The secondary inductive coil receives power and data from a primary inductive coil 2017, which is external to the body. The electronics package 2014 and secondary inductive coil 2016 are held together by the molded body 2018. The molded body 18 holds the electronics package 2014 and secondary inductive coil 16 end to end. The secondary inductive coil 16 is placed around the electronics package 2014 in the molded body 2018. The molded body 2018 holds the secondary inductive coil 2016 and electronics package 2014 in the end to end orientation and minimizes the thickness or height above the sclera of the entire device. The molded body 2018 may also include suture tabs 2020. The molded body 2018 narrows to form a strap 2022 which surrounds the sclera and holds the molded body 2018, secondary inductive coil 2016, and electronics package 2014 in place. The molded body 2018, suture tabs 2020 and strap 2022 are preferably an integrated unit made of silicone elastomer. Silicone elastomer can be formed in a pre-curved shape to match the curvature of a typical sclera. However, silicone remains flexible enough to accommodate implantation and to adapt to variations in the curvature of an individual sclera. The secondary inductive coil 2016 and molded body 2018 are preferably oval shaped. A strap 2022 can better support an oval shaped coil. It should be noted that the entire implant is attached to and supported by the sclera. An eye moves constantly. The eye moves to scan a scene and also has a jitter motion to improve acuity. Even though such motion is useless in the blind, it often continues long after a person has lost their sight. By placing the device under the rectus muscles with the electronics package in an area of fatty tissue between the rectus muscles, eye motion does not cause any flexing which might fatigue, and eventually damage, the device.

Figure 17:
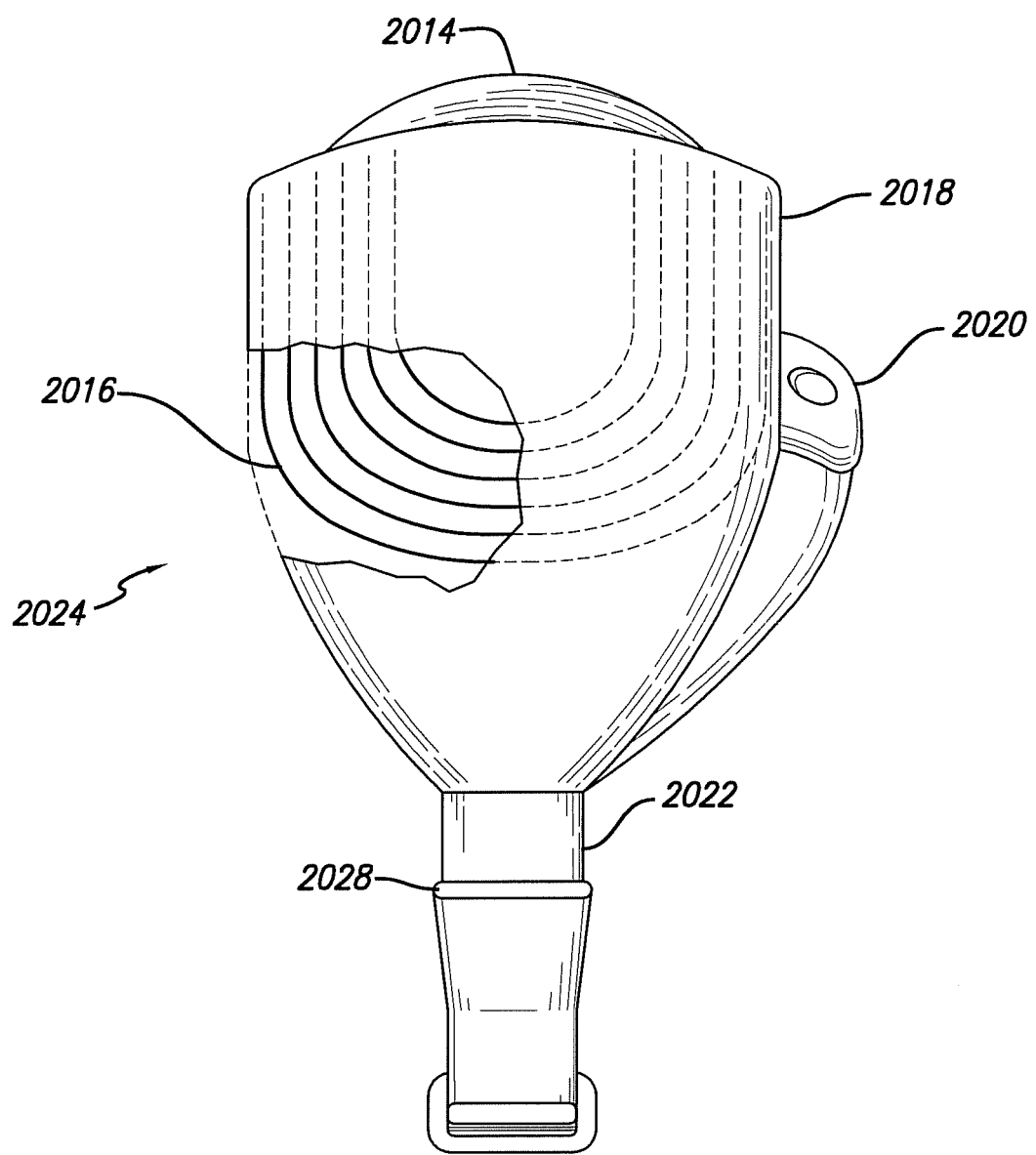
FIG. 17 is a side view of the implanted portion of the preferred visual prosthesis showing the fan tail in more detail.

FIG. 17 shows a side view of the implanted portion of the visual prosthesis, in particular, emphasizing the fan tail 2024. When implanting the visual prosthesis, it is necessary to pass the strap 2022 under the eye muscles to surround the sclera. The secondary inductive coil 2016 and molded body 2018 must also follow the strap 2022 under the lateral rectus muscle on the side of the sclera. The implanted portion of the visual prosthesis is very delicate. It is easy to tear the molded body 2018 or break wires in the secondary inductive coil 2016. In order to allow the molded body 18 to slide smoothly under the lateral rectus muscle, the molded body 2018 is shaped in the form of a fan tail 2024 on the end opposite the electronics package 2014. The strap 2022 further includes a hook 2028 the aids the surgeon in passing the strap under the rectus muscles.

Figure 18:
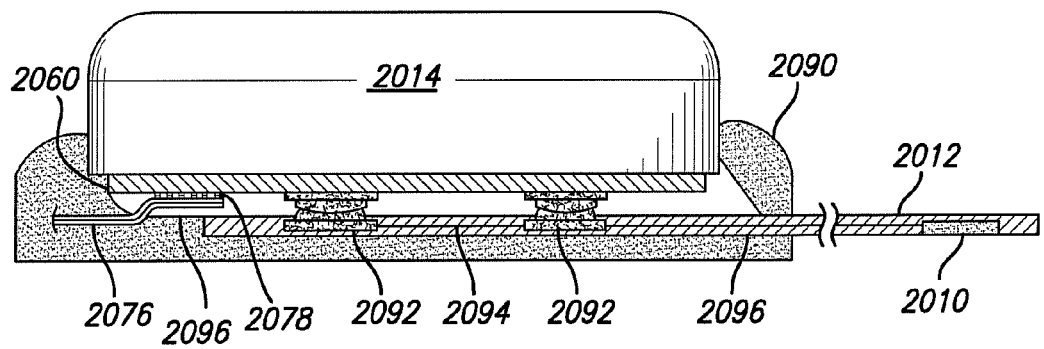
FIG. 18 is a view of the completed package attached to an electrode array.

Referring to FIG. 18, the flexible circuit 1, includes platinum conductors 2094 insulated from each other and the external environment by a biocompatible dielectric polymer 2096, preferably polyimide. One end of the array contains exposed electrode sites that are placed in close proximity to the retinal surface 2010. The other end contains bond pads 2092 that permit electrical connection to the electronics package 2014. The electronic package 2014 is attached to the flexible circuit 1 using a flip-chip bumping process, and epoxy underfilled. In the flip-chip bumping process, bumps containing conductive adhesive placed on bond pads 2092 and bumps containing conductive adhesive placed on the electronic package 2014 are aligned and melted to build a conductive connection between the bond pads 2092 and the electronic package 2014. Leads 2076 for the secondary inductive coil 2016 are attached to gold pads 2078 on the ceramic substrate 2060 using thermal compression bonding, and are then covered in epoxy. The electrode array cable 2012 is laser welded to the assembly junction and underfilled with epoxy. The junction of the secondary inductive coil 2016, array 2001, and electronic package 2014 are encapsulated with a silicone overmold 2090 that connects them together mechanically. When assembled, the hermetic electronics package 2014 sits about 3 mm away from the end of the secondary inductive coil.

Since the implant device is implanted just under the conjunctiva it is possible to irritate or even erode through the conjunctiva. Eroding through the conjunctiva leaves the body open to infection. We can do several things to lessen the likelihood of conjunctiva irritation or erosion. First, it is important to keep the over all thickness of the implant to a minimum. Even though it is advantageous to mount both the electronics package 2014 and the secondary inductive coil 2016 on the lateral side of the sclera, the electronics package 2014 is mounted higher than, but not covering, the secondary inductive coil 2016. In other words the thickness of the secondary inductive coil 2016 and electronics package should not be cumulative.

It is also advantageous to place protective material between the implant device and the conjunctiva. This is particularly important at the scleratomy, where the thin film electrode array cable 2012 penetrates the sclera. The thin film electrode array cable 2012 must penetrate the sclera through the pars plana, not the retina. The scleratomy is, therefore, the point where the device comes closest to the conjunctiva. The protective material can be provided as a flap attached to the implant device or a separate piece placed by the surgeon at the time of implantation. Further material over the scleratomy will promote healing and sealing of the scleratomy. Suitable materials include DACRON®, TEFLON®, GORETEX® (ePTFE), TUTOPLAST® (sterilized sclera), MERSILENE® (polyester) or silicone.

Figure 19:
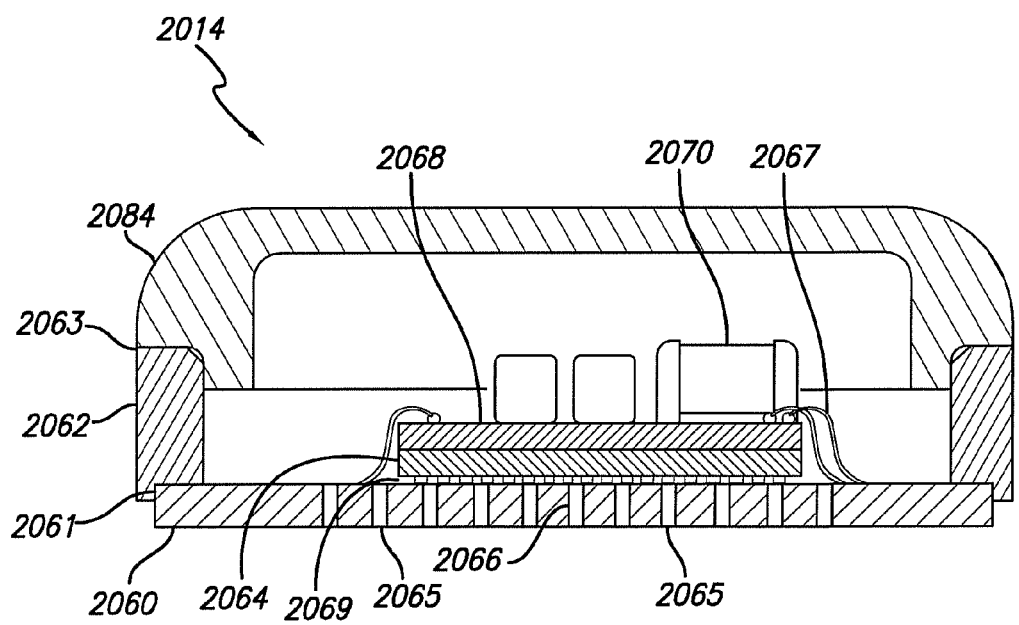
FIG. 19 is a cross-section of the package.

Referring to FIG. 19, the package 2014 contains a ceramic substrate 2060, with metalized vias 2065 and thin-film metallization 2066. The package 2014 contains a metal case wall 2062 which is connected to the ceramic substrate 2060 by braze joint 2061. On the ceramic substrate 2060 an underfill 2069 is applied. On the underfill 69 an integrated circuit chip 2064 is positioned. On the integrated circuit chip 2064 a ceramic hybrid substrate 2068 is positioned. On the ceramic hybrid substrate 2068 passives 2070 are placed. Wirebonds 2067 are leading from the ceramic substrate 2060 to the ceramic hybrid substrate 2068. A metal lid 2084 is connected to the metal case wall 2062 by laser welded joint 2063 whereby the package 2014 is sealed.

Figure 20:
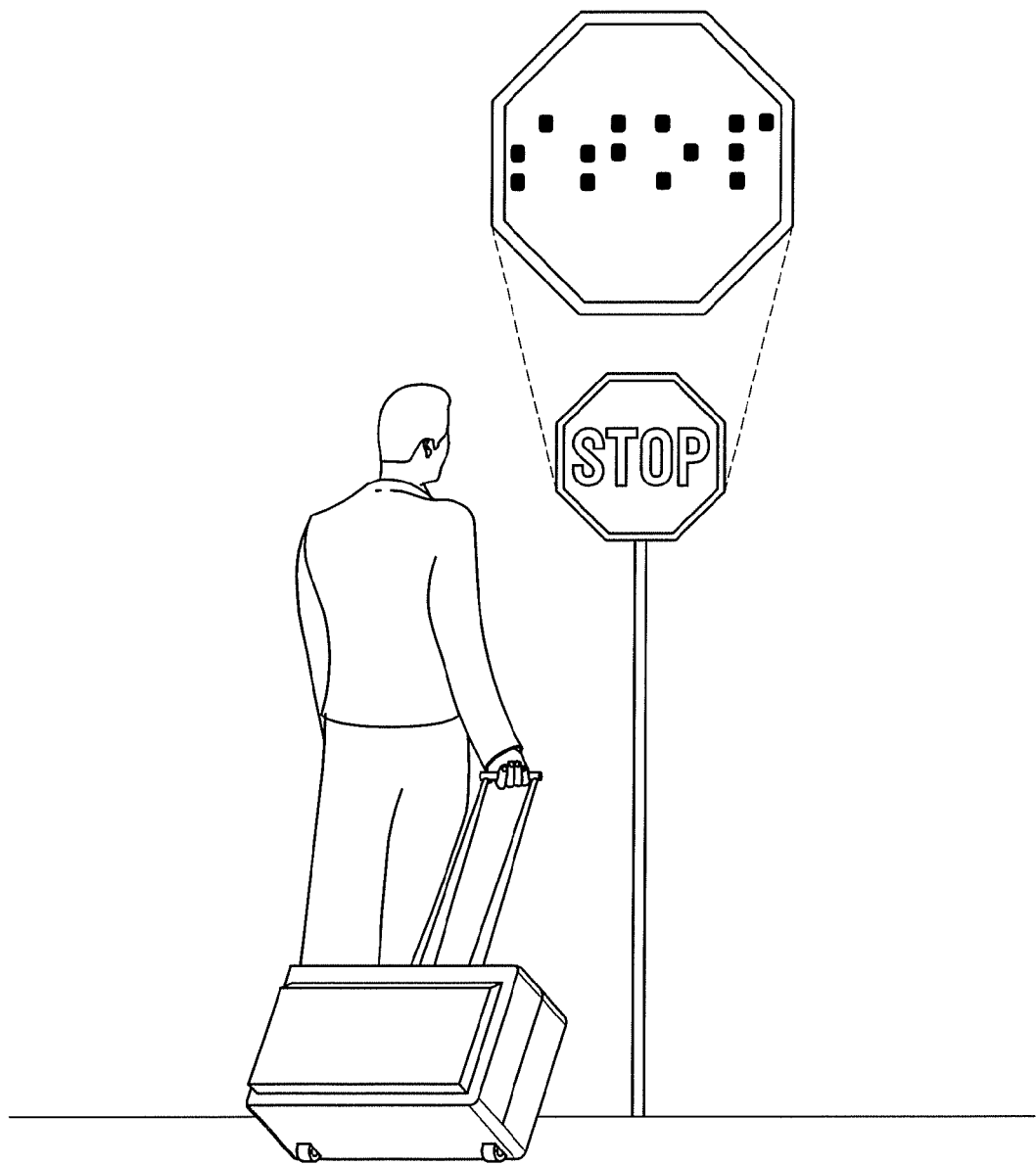
FIG. 20 shows a person facing a stop sign translated to brail as taught by the present invention.

Referring to FIG. 20, and as noted above, with higher resolution arrays in the retinal stimulation system it is possible to present words or phrases. It will be possible to superimpose a braille characters over letters in a visual scene. As shown in the example, a stop sign can be converted to the braille characters for stop.

Accordingly, what has been shown is an improved visual prosthesis and an improved method for limiting power consumption in a visual prosthesis. While the invention has been described by means of specific embodiments and applications thereof, it is understood that numerous modifications and variations could be made thereto by those skilled in the art without departing from the spirit and scope of the invention. It is therefore to be understood that within the scope of the claims, the invention may be practiced otherwise than as specifically described herein.

The invention claimed is:

1. A method of processing written words in a visual prosthesis comprising:
   providing a visual prosthesis including a camera, video processor, and implantable stimulation system configured to stimulate visual neurons;
   recording a visual scene with the camera and transferring data representing the visual scene to the video processor;
   converting the data to visual stimulation patterns;
   presenting the visual stimulation patterns including the visual scene to a user through the implantable stimulation system;
   scanning the data for patterns representing written characters;
   switching to a reading mode upon recognition by the video processor of patterns representing written characters, wherein said reading mode includes:
      converting the written characters to Braille characters;
      encoding the Braille characters into the visual stimulation patterns, creating altered stimulation patterns; and
      presenting the altered visual stimulation patterns including the Braille characters to a user through the implantable stimulation system;
   switching back to presenting the visual stimulation patterns including the visual scene through the implantable stimulation system, after presenting the altered visual stimulation patterns including the Braille characters.

2. The method according to claim 1, wherein the step of presenting the Braille characters includes presenting only Braille characters without the visual scene.

3. The method according to claim 2, wherein the Braille characters are presented sequentially.

4. The method according to claim 3, wherein the Braille characters are presented for less than one second per letter.

5. The method according to claim 4, wherein the Braille characters are present for about 500 milliseconds.

6. The method according to claim 4, wherein the Braille characters are presented for about 250 milliseconds.

7. The method according to claim 3, wherein a first gap between characters is different than a second gap between words.

8. The method according to claim 3, wherein a gap between characters is less than one second.

9. The method according to claim 1, wherein the step of presenting the Braille characters is presenting a visual scene with Braille characters overlaid over the written characters in the visual scene.

* * * * *